(12) United States Patent
Arye

(10) Patent No.: US 6,438,168 B2
(45) Date of Patent: Aug. 20, 2002

(54) BANDWIDTH SCALING OF A COMPRESSED VIDEO STREAM

(75) Inventor: Ram Arye, Rishon-Le-Zion (IL)

(73) Assignee: Bamboo Media Casting, Inc., Wilmington, DE (US)

( * ) Notice: Subject to any disclaimer, the term of this patent is extended or adjusted under 35 U.S.C. 154(b) by 0 days.

(21) Appl. No.: 09/887,991

(22) Filed: Jun. 23, 2001

Related U.S. Application Data

(60) Provisional application No. 60/214,550, filed on Jun. 27, 2000.

(51) Int. Cl.[7] .................................... H04N 7/12
(52) U.S. Cl. .................................... 375/240.03
(58) Field of Search ................ 375/240.03, 240.15; 348/423.1; 710/268; H04N 7/12

(56) References Cited

U.S. PATENT DOCUMENTS

| | | | |
|---|---|---|---|
| 5,488,570 A | | 1/1996 | Agarwal |
| 6,016,307 A | | 1/2000 | Kaplan et al. |
| 6,256,348 B1 | * | 7/2001 | Laczko et al. ......... 375/240.15 |
| 6,263,396 B1 | * | 7/2001 | Cottle et al. ............. 710/268 |
| 6,369,855 B1 | * | 4/2002 | Chauvel et al. .......... 348/423.1 |

FOREIGN PATENT DOCUMENTS

EP      1032213      8/2000

OTHER PUBLICATIONS

Youn et al, "Motion Vector Refinement for High–Performance Transcoding", Mar. 1999, IEEE Transactions on Multimedia, vol. 1, No. 1, pp. 30–40.*

* cited by examiner

Primary Examiner—Young Lee
(74) Attorney, Agent, or Firm—Boris G. Tankhilevich

(57) ABSTRACT

An original previously compressed video stream image having a first level of compression including a first level of quantization is decompressed, and a set of original motion vectors for each P source picture and for each B source picture is recovered and saved. The decompressed video stream image is re-compressed re-using the most relevant saved original motion vectors in order to create a re-compressed video stream image having a second level of compression including a second level of quantization. The most relevant motion vectors point out to the camera movement and to the moving objects within the original reference frame.

27 Claims, 19 Drawing Sheets

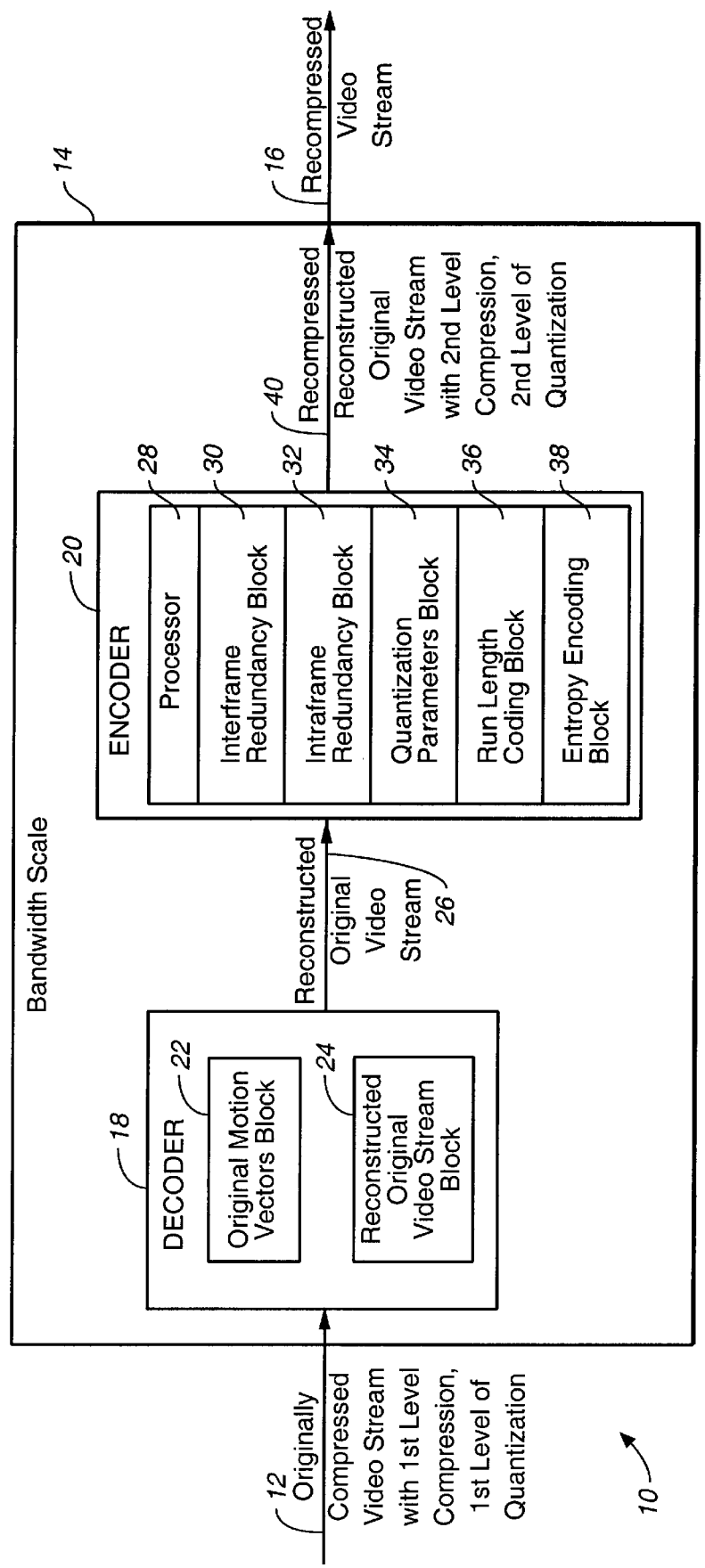
FIG._1 (PRIOR ART)

A Typical Group of Pictures in Display Order
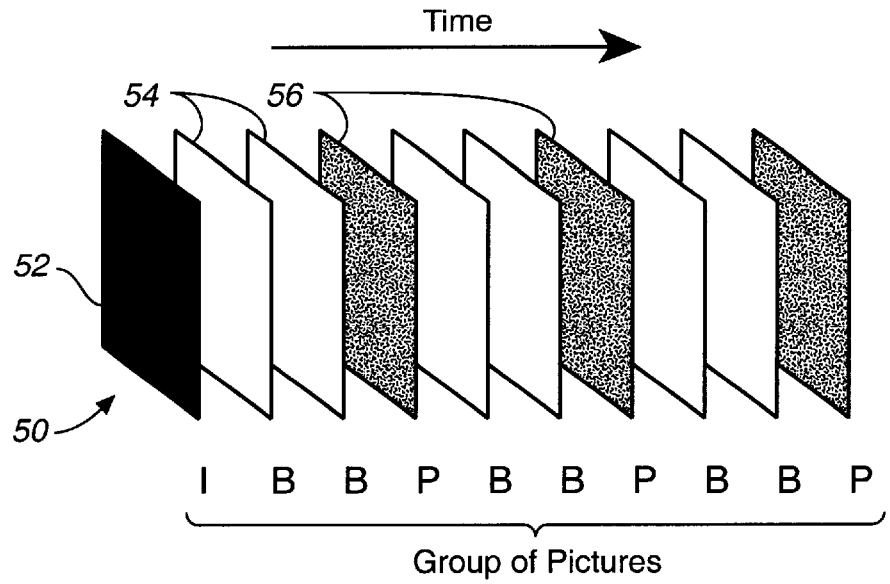
FIG._2 (PRIOR ART)
A Typical Group of Pictures in Coding Order
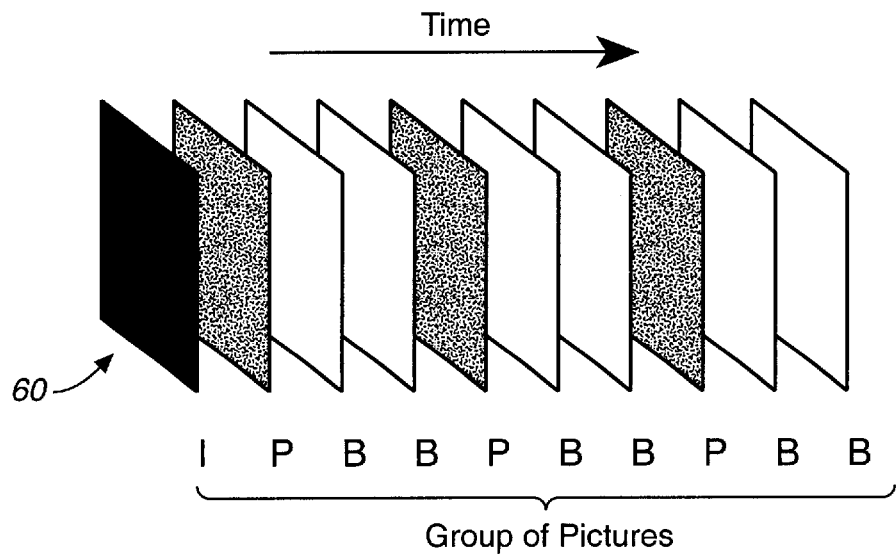
FIG._3 (PRIOR ART)

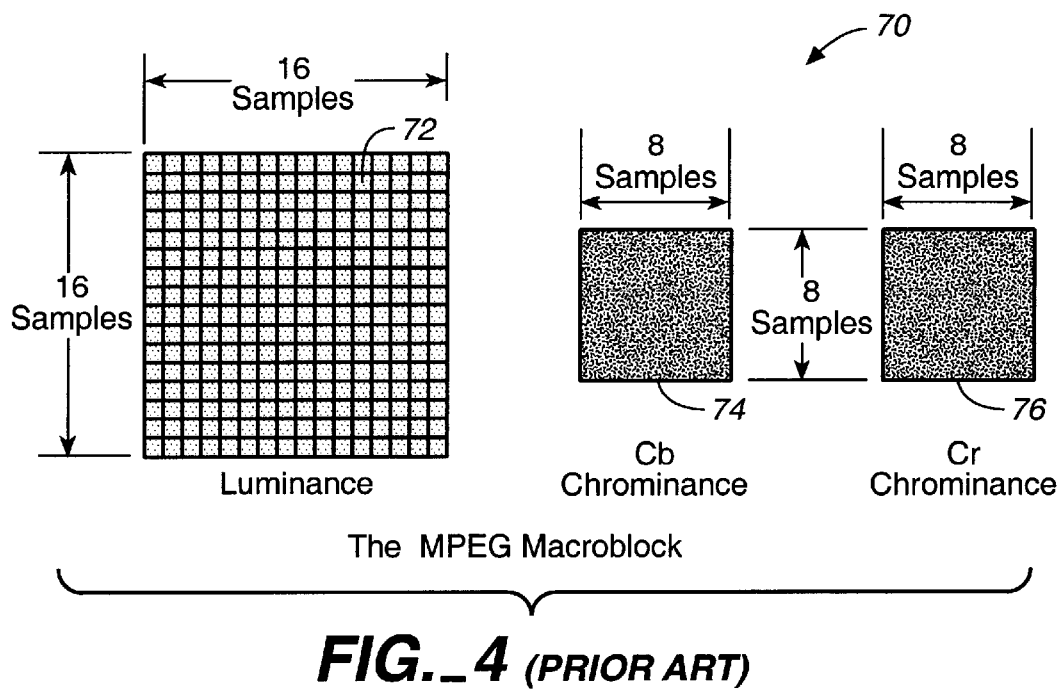
FIG._4 (PRIOR ART)
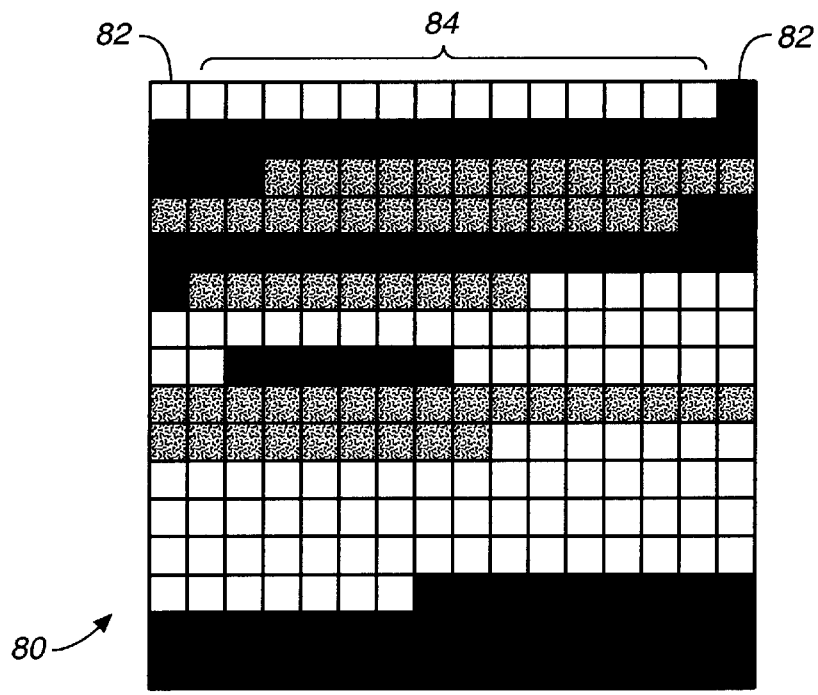
An Illustration of a Possible Slice Structure in an MPEG-1 Picture
FIG._5 (PRIOR ART)

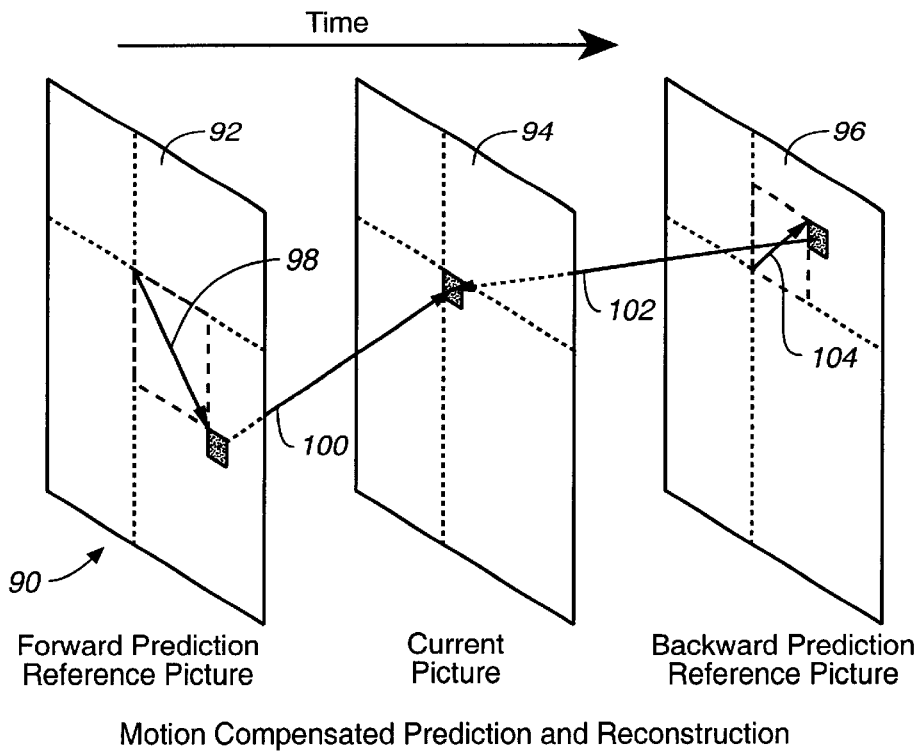
Motion Compensated Prediction and Reconstruction
*FIG._6* *(PRIOR ART)*
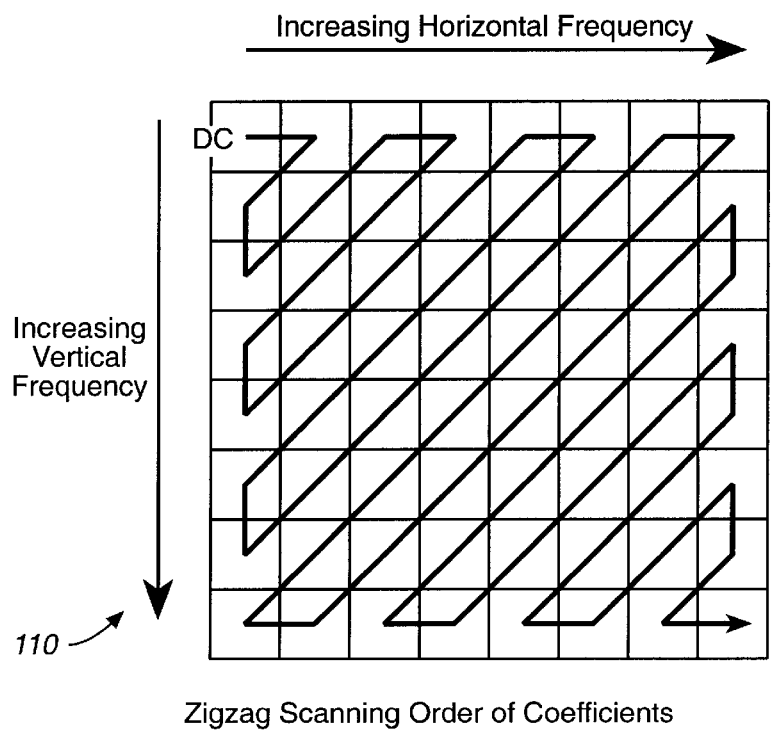
Zigzag Scanning Order of Coefficients
*FIG._7* *(PRIOR ART)*

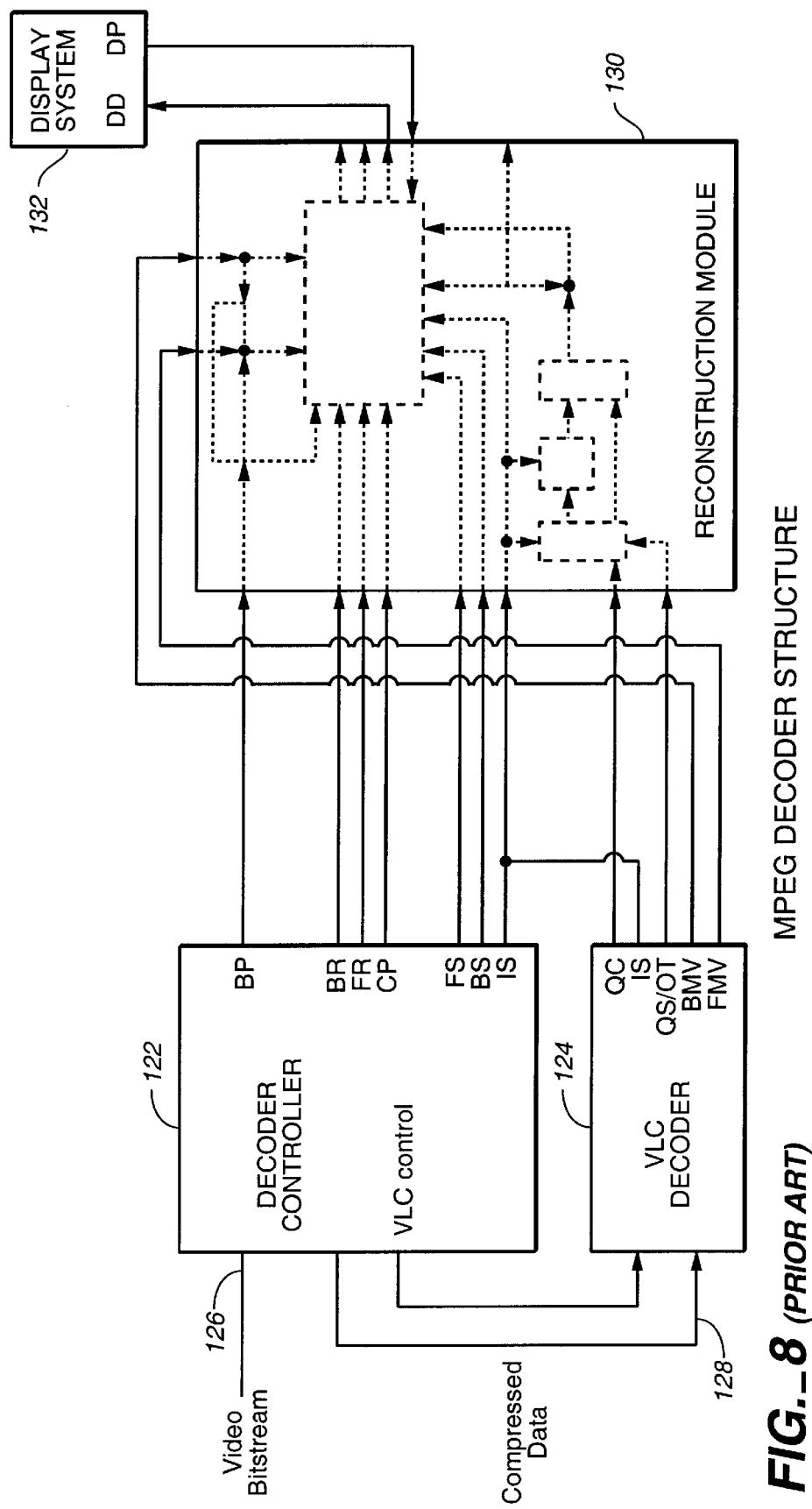
FIG._8 (PRIOR ART)

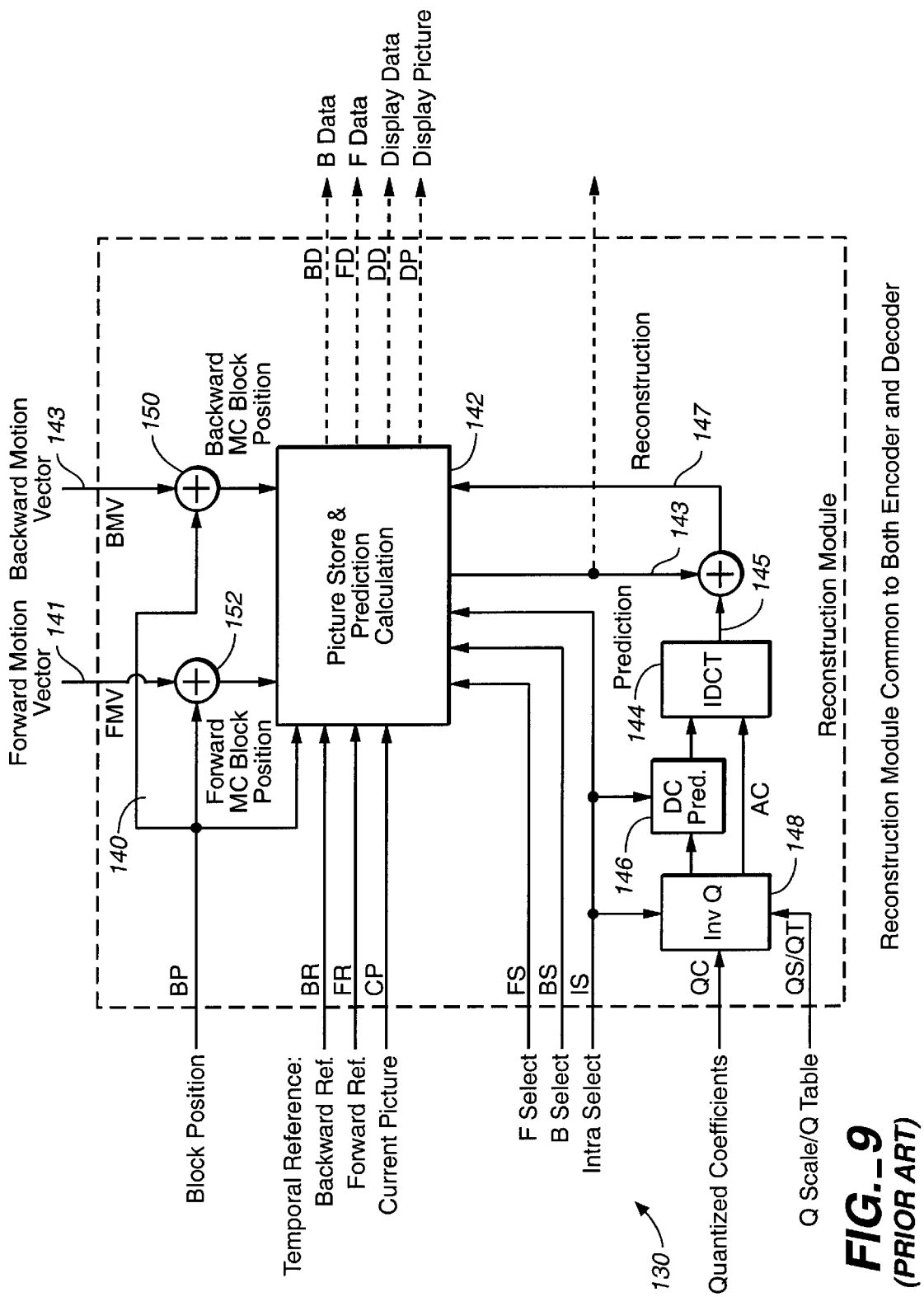
FIG._9 (PRIOR ART)

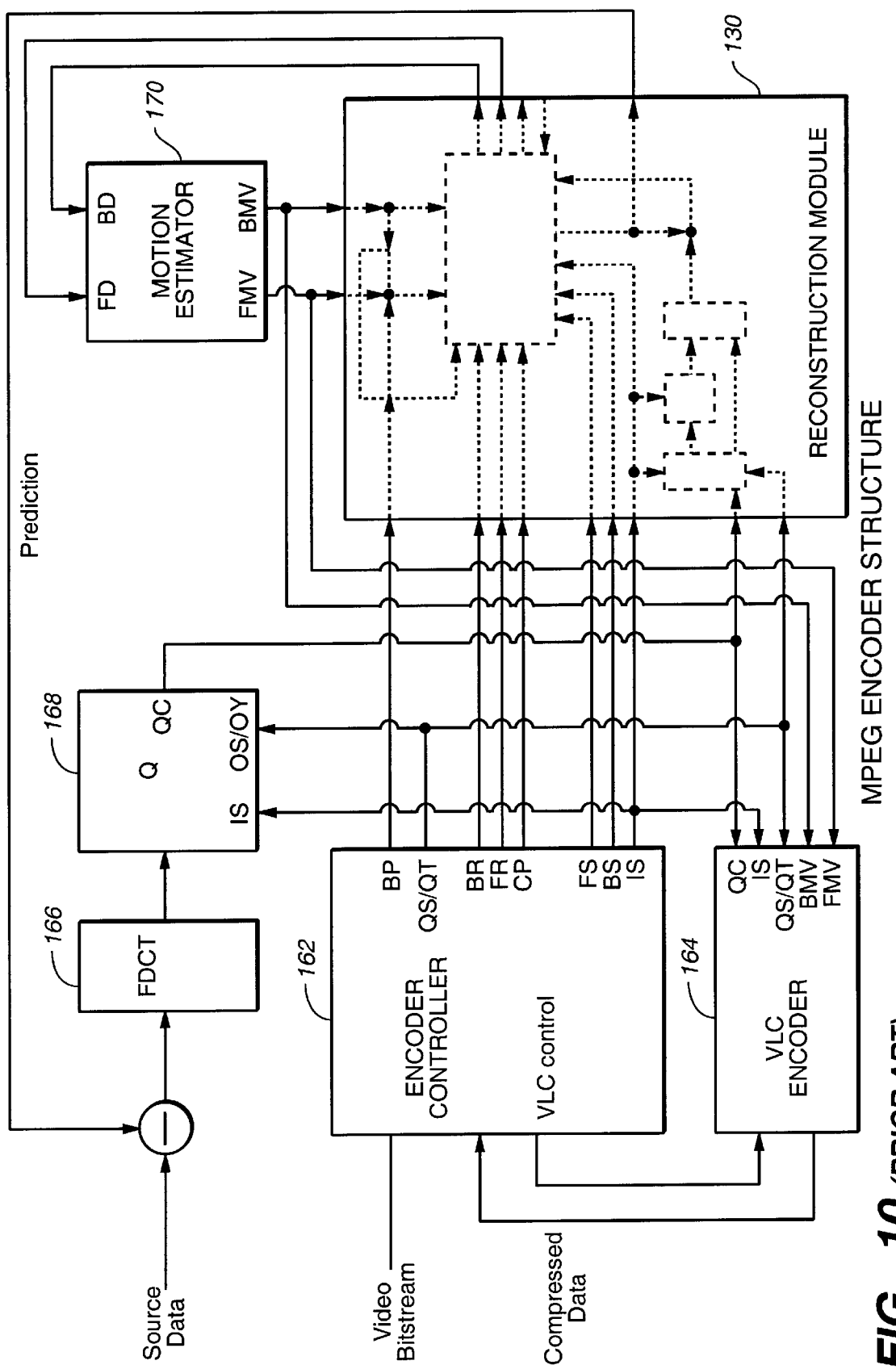
FIG._10 (PRIOR ART)

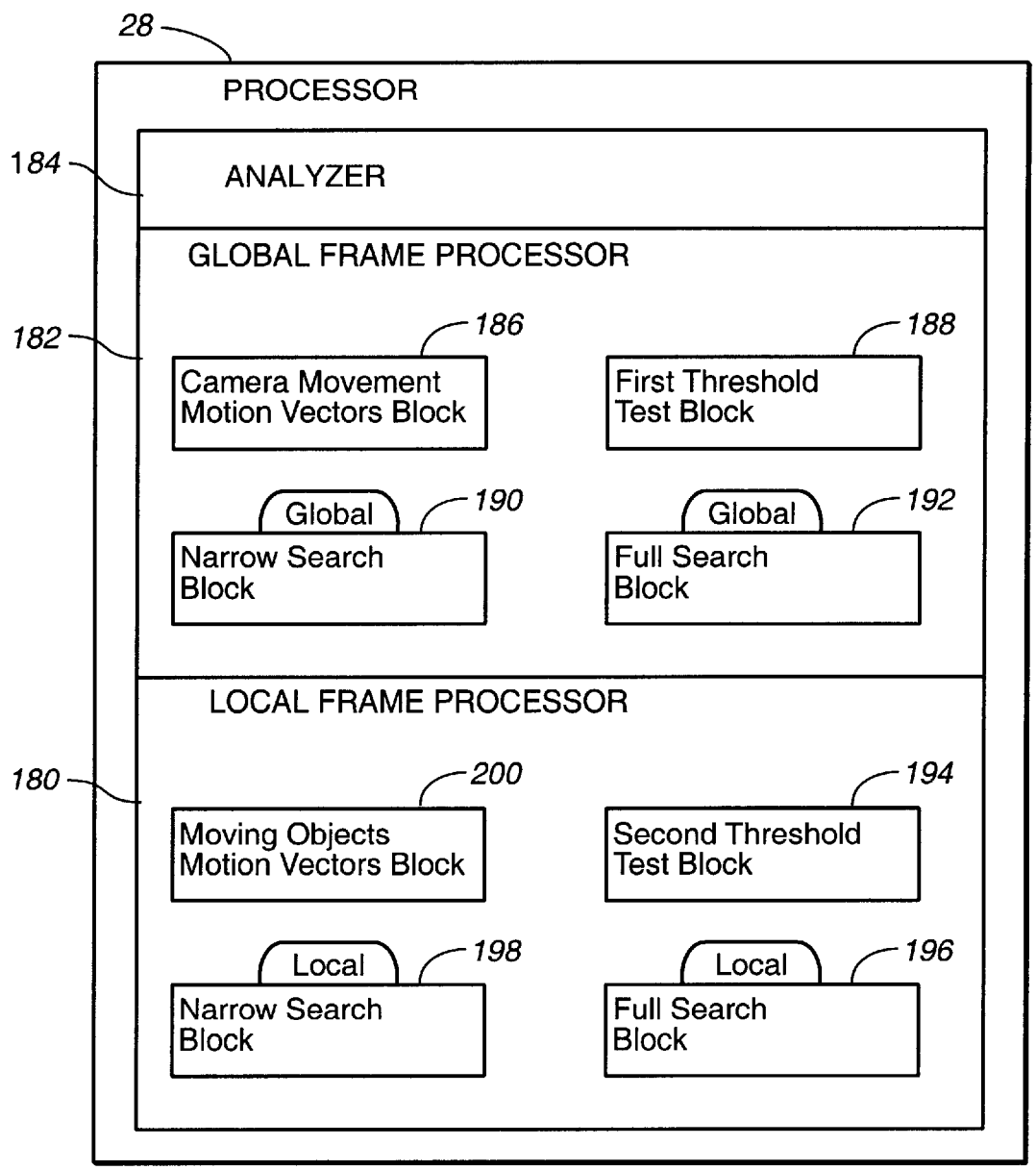
FIG._11

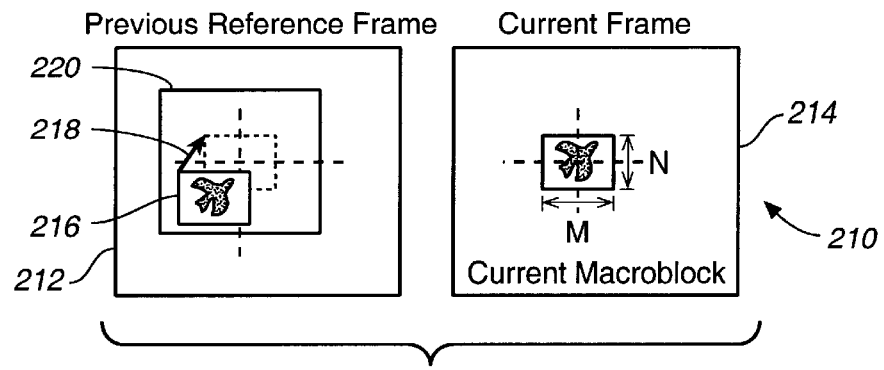
FIG._12 (PRIOR ART)
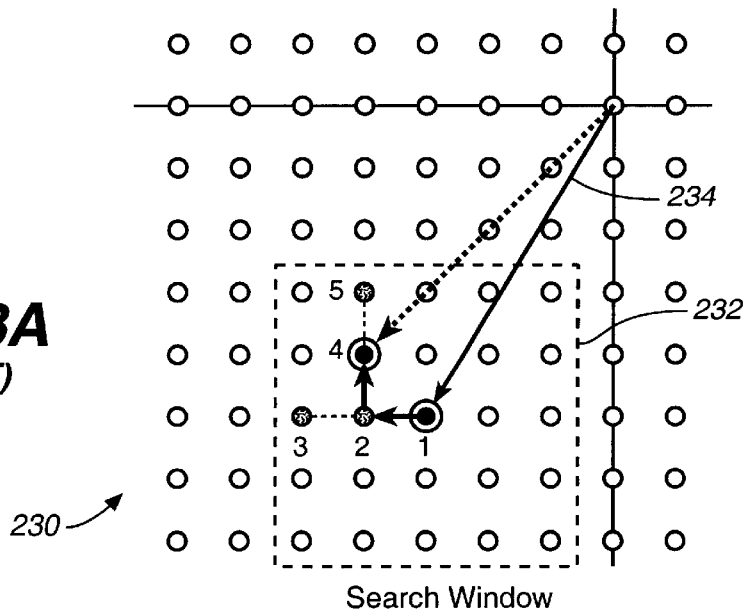
FIG._13A
(PRIOR ART)
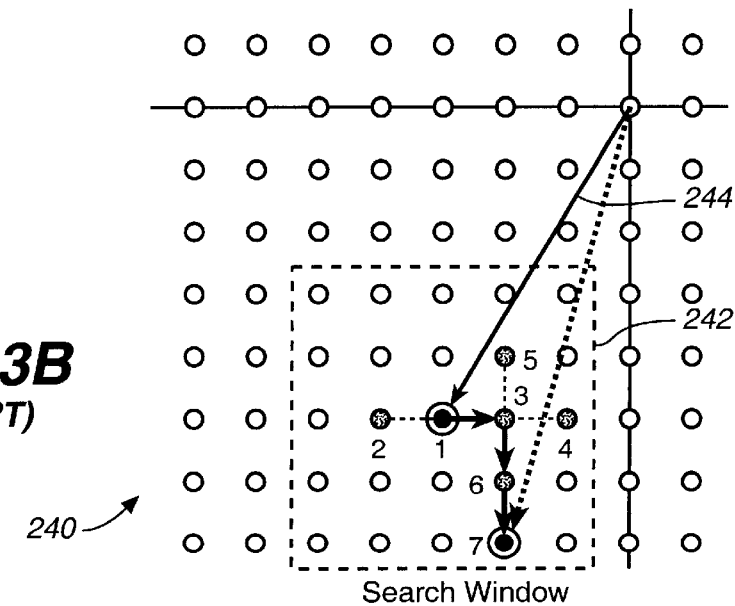
FIG._13B
(PRIOR ART)

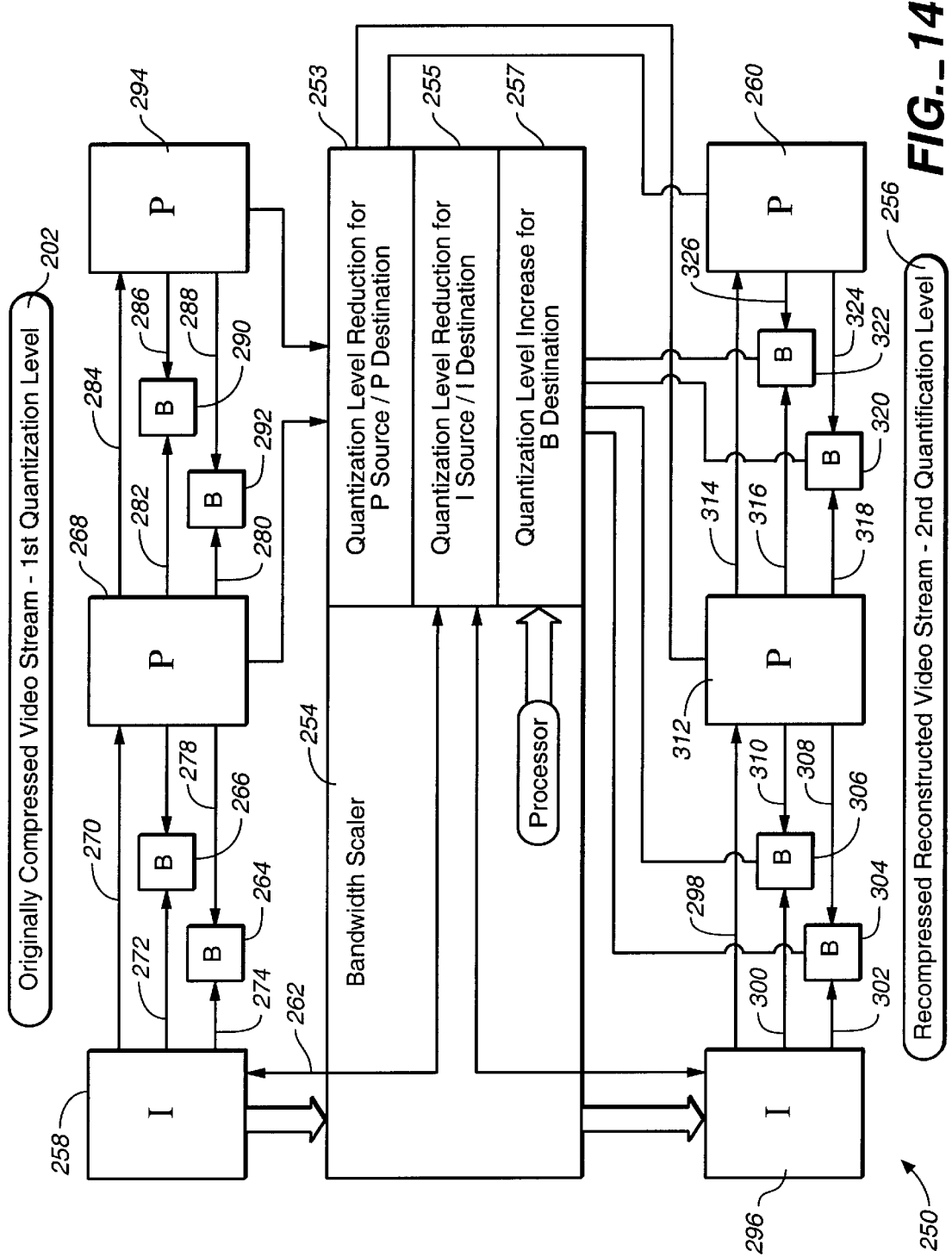
FIG._14

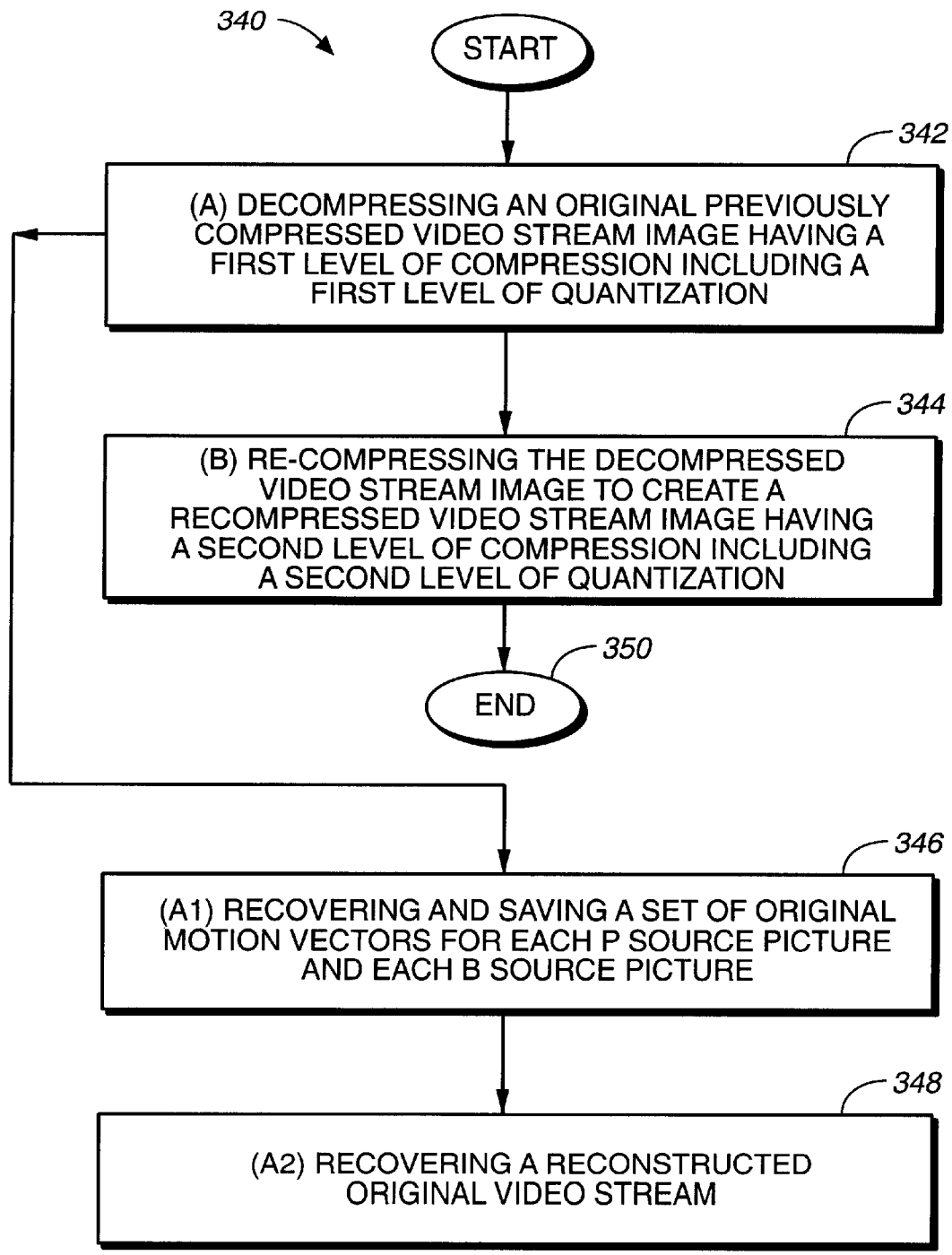
FIG._15

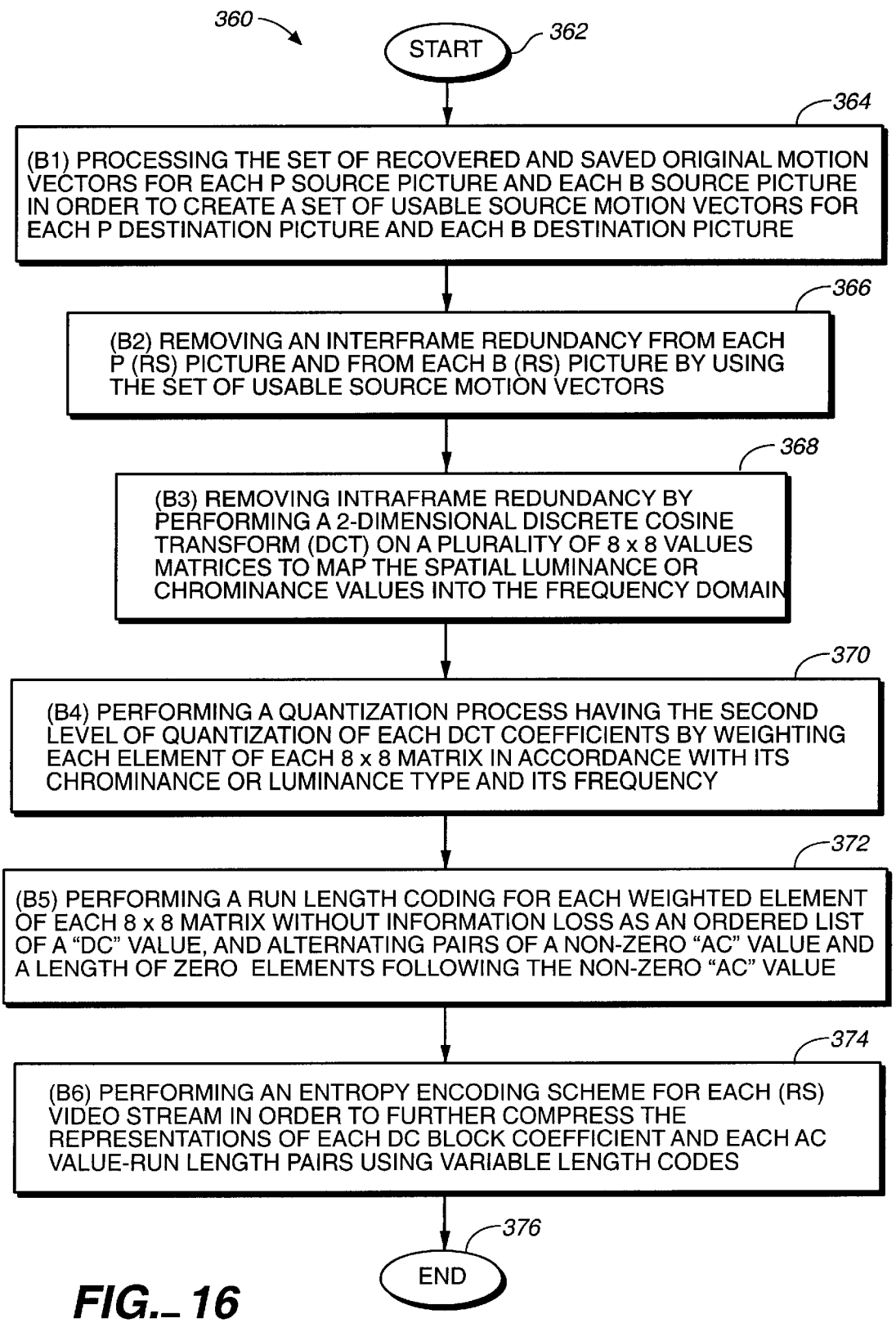
FIG._16

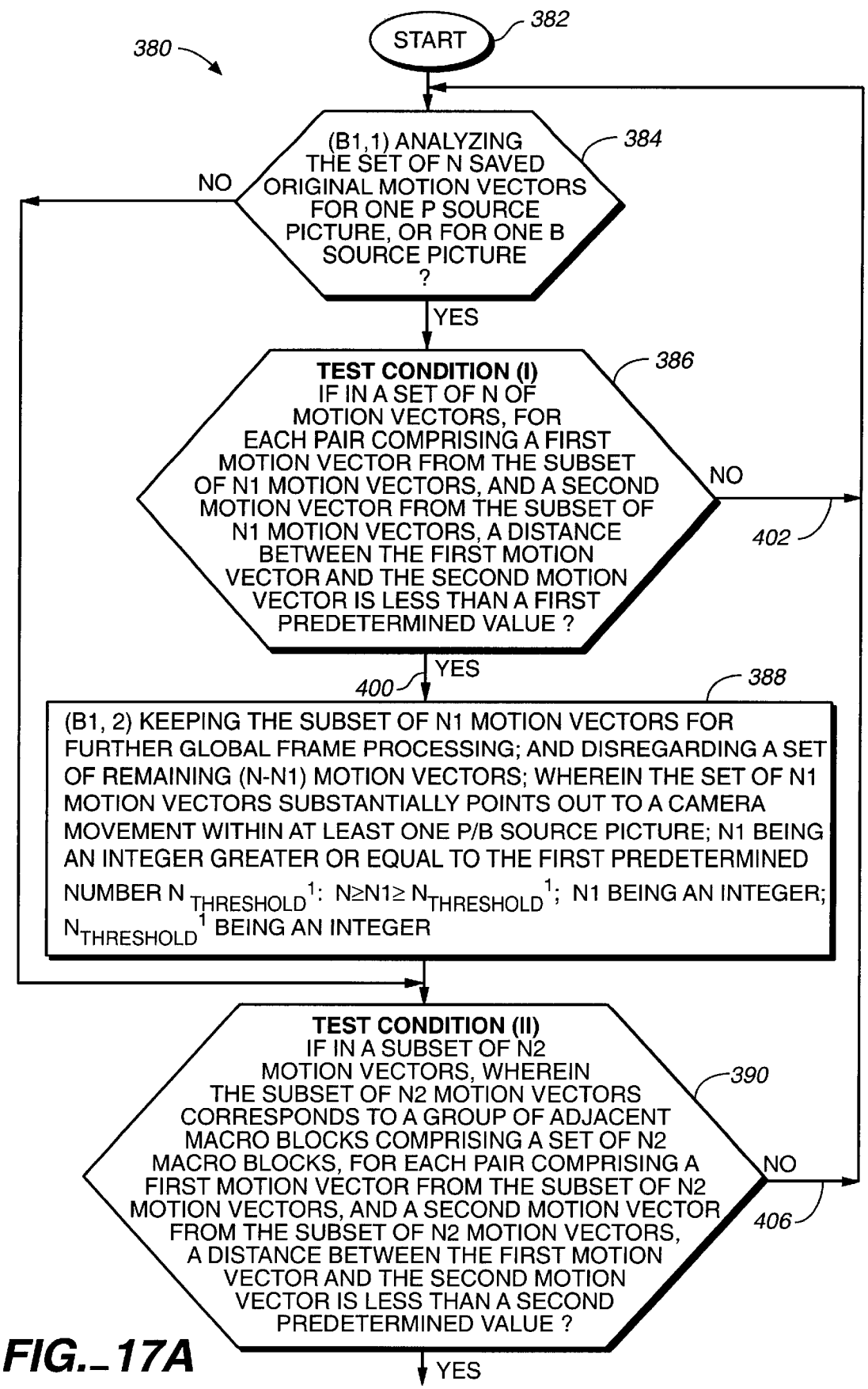
FIG._17A

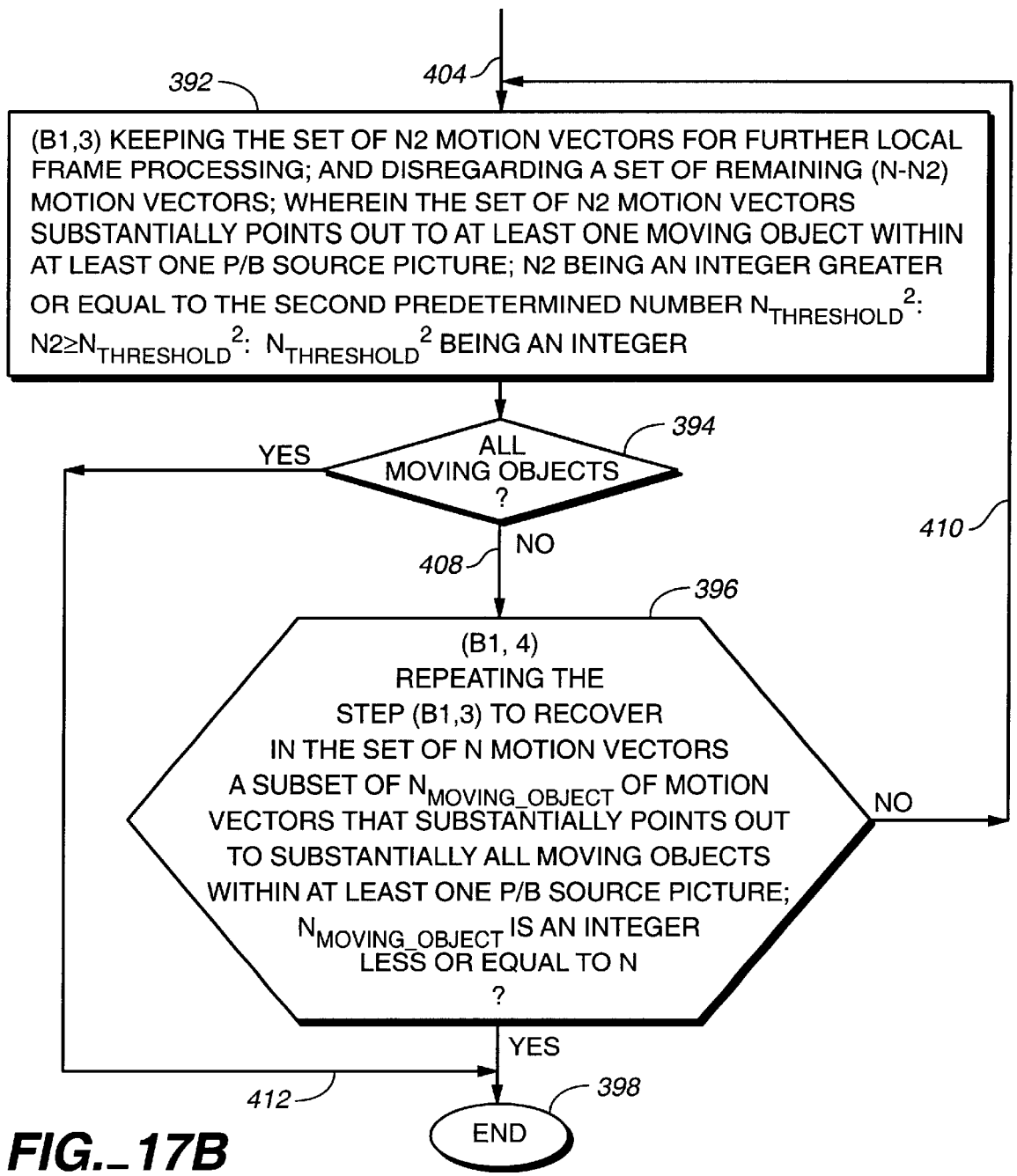
FIG._17B

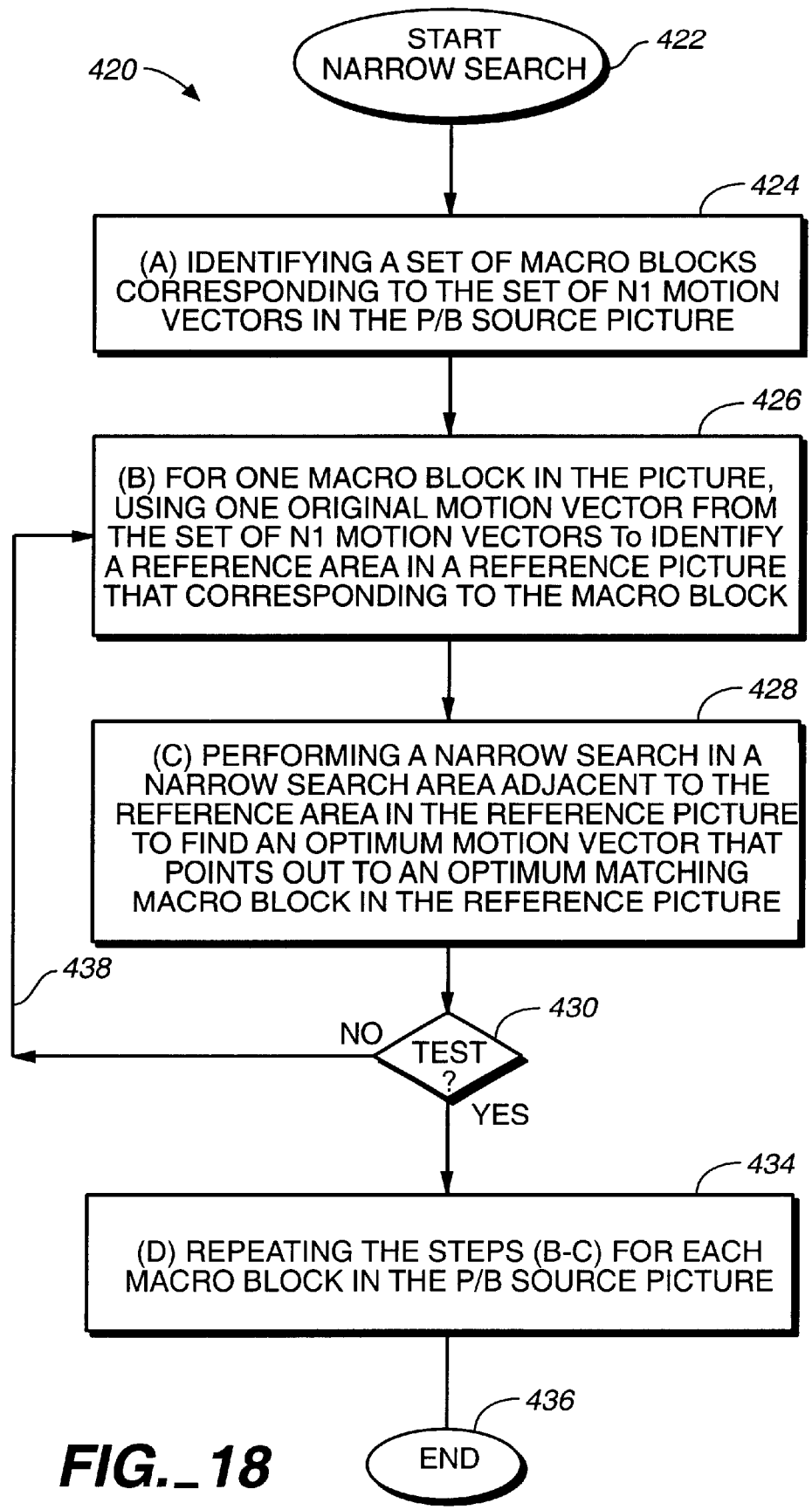
FIG._18

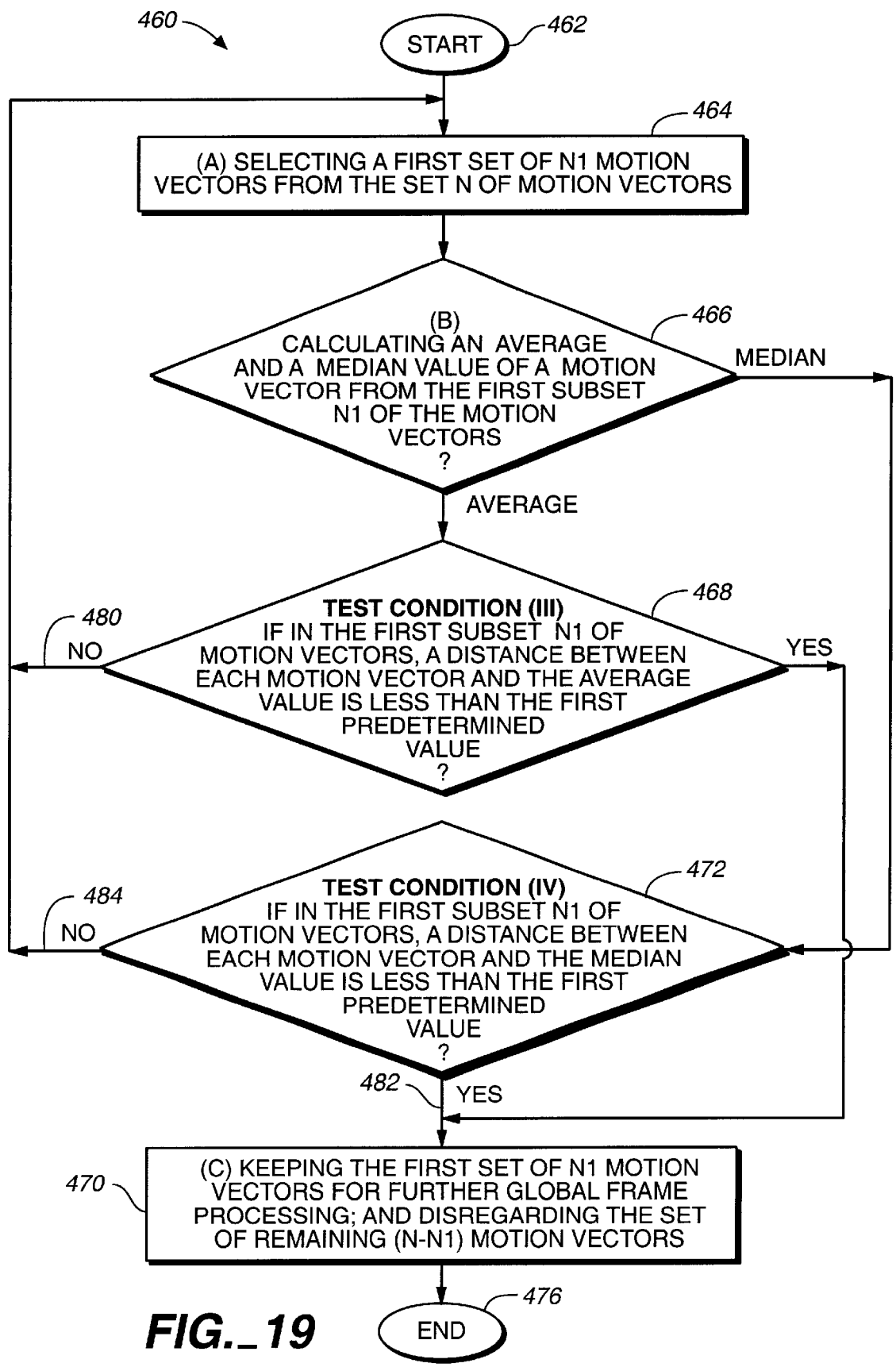
FIG._19

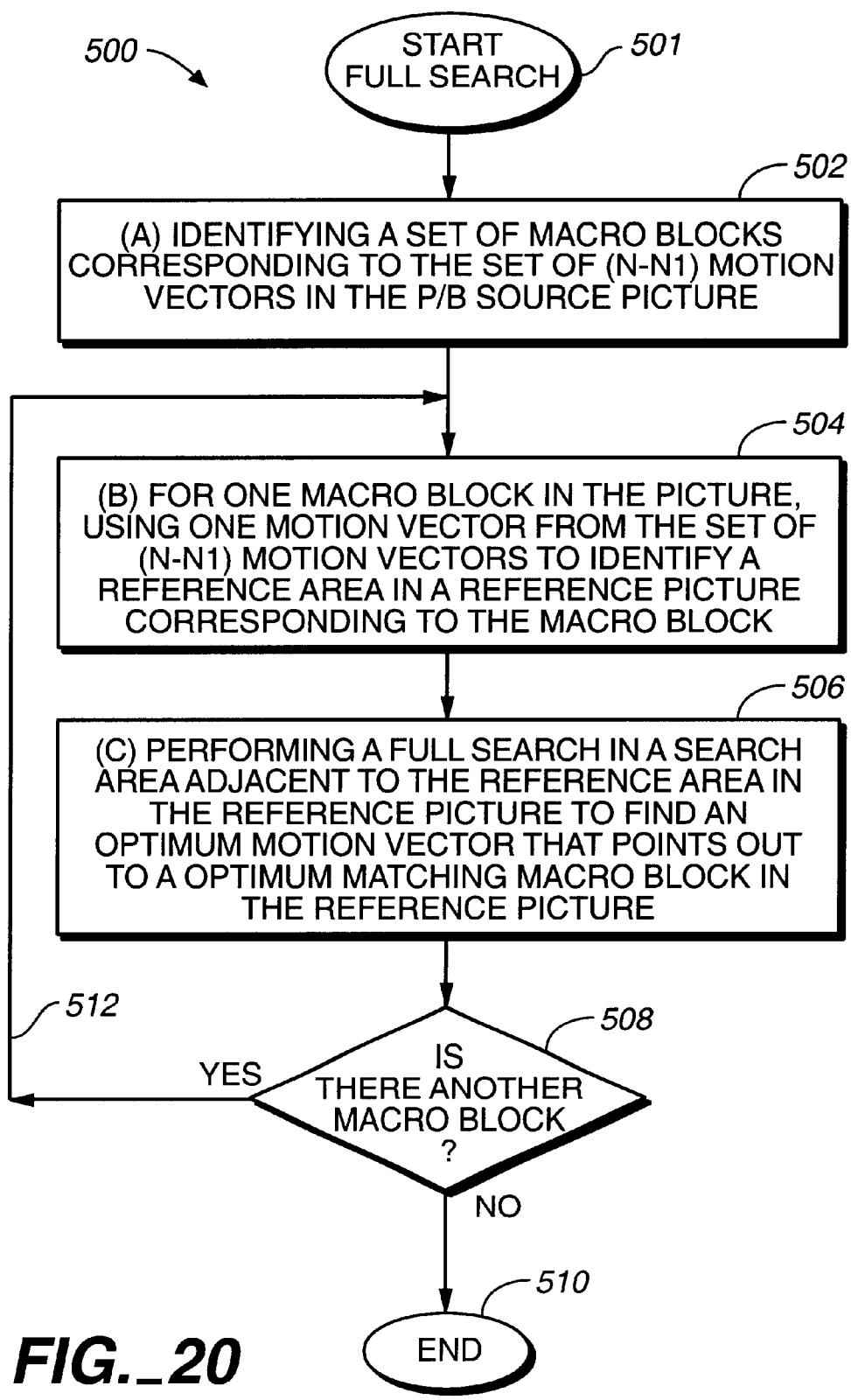
FIG._20

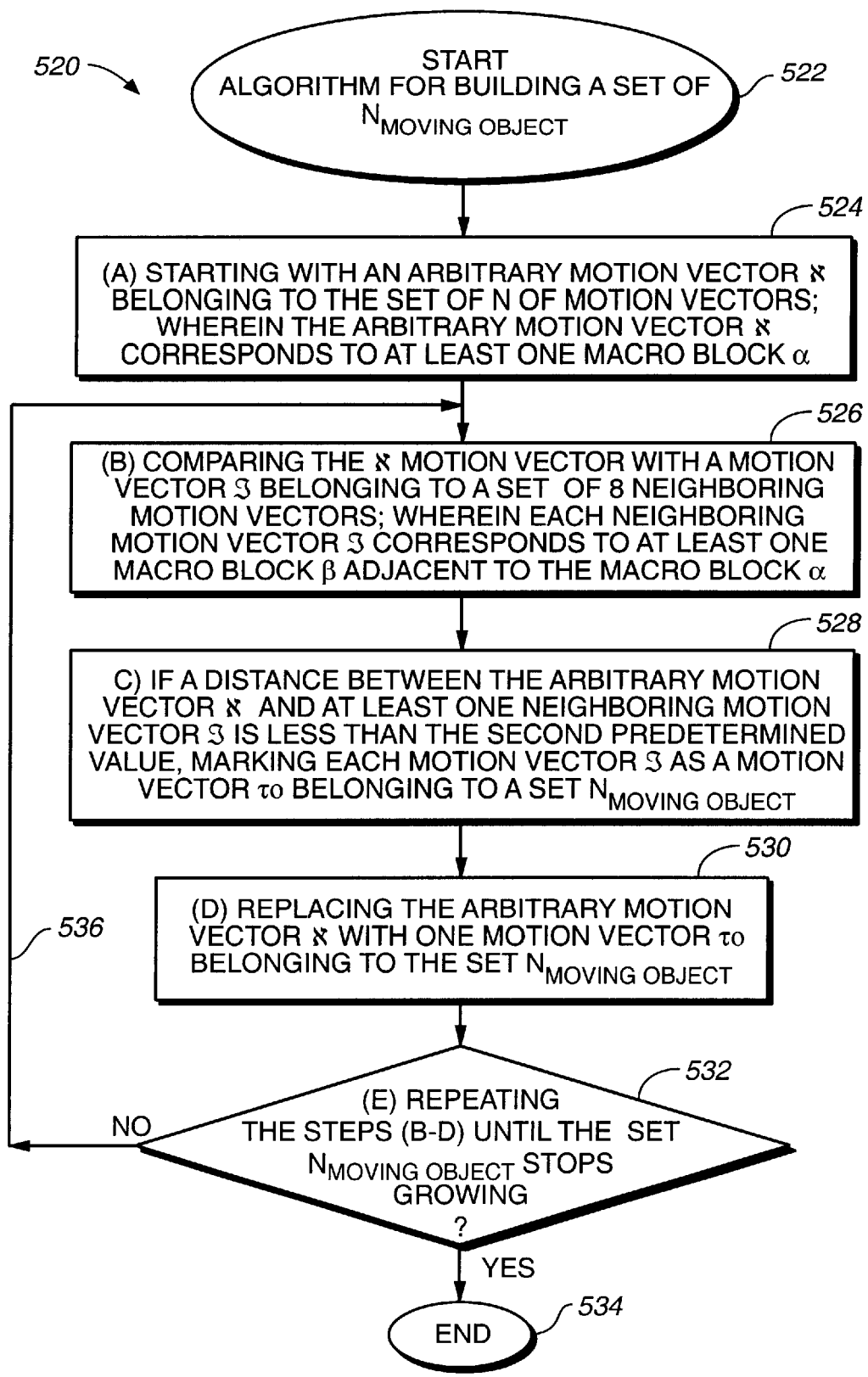
FIG._21

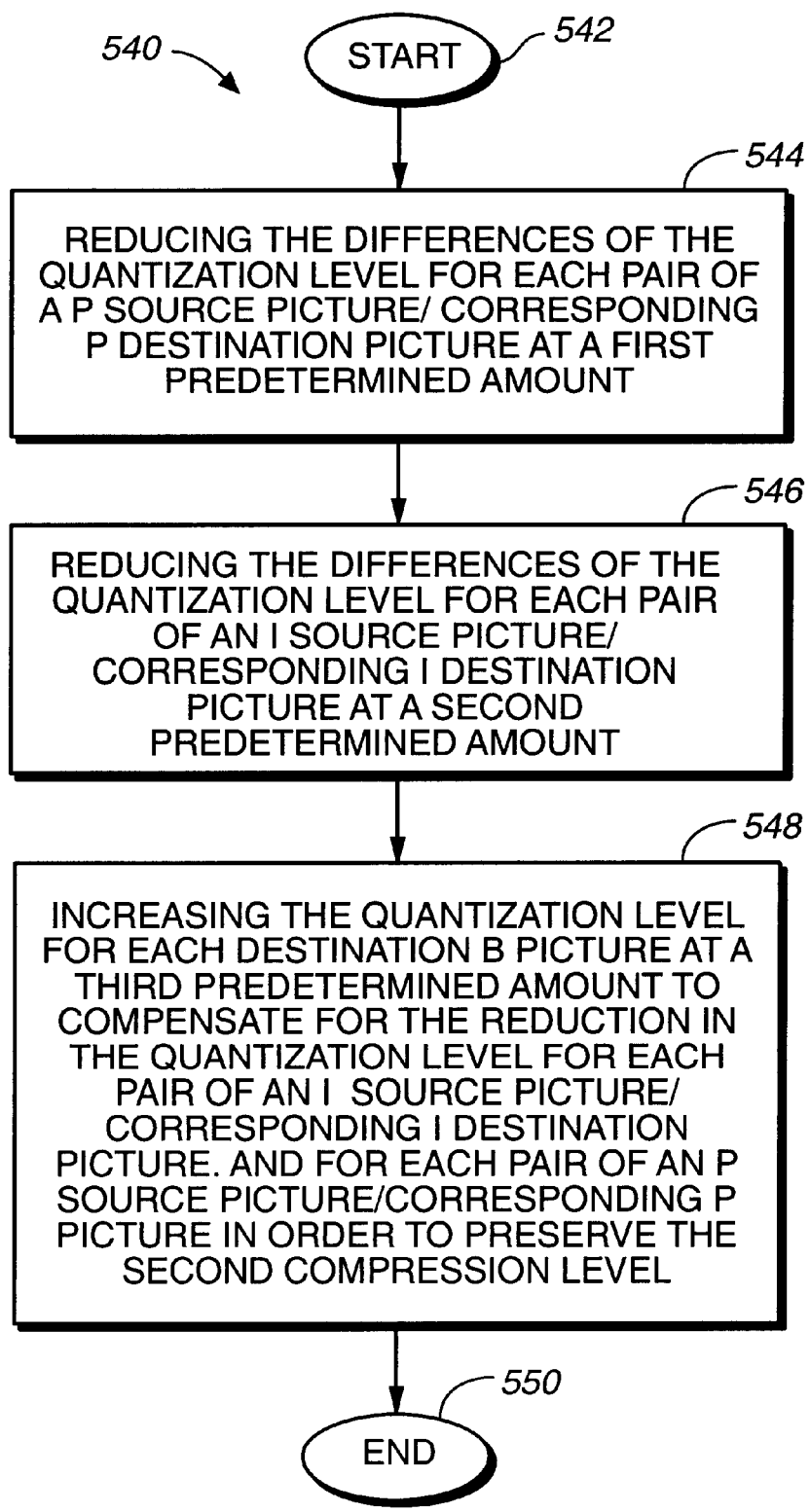
FIG._22

BANDWIDTH SCALING OF A COMPRESSED VIDEO STREAM

This application claims the priority under the provisional Patent Application No. 60/214,550, filed on Jun. 27, 2000, and entitled: "Methods for bandwidth scaling of a compressed video stream".

BACKGROUND OF THE INVENTION

1. Field of the Invention

The present invention relates to multimedia signal processing, or more specifically, to bandwidth scaling of a compressed video stream.

2. Discussion of the Prior Art

Converting a previously compressed video bit stream to a lower bit rate through transcoding provides dynamic adjustments of the bitrate of the coded video bit stream to meet various channels solutions.

The principal goal of any transcoding system is to achieve a higher level of compression than the one that the original coding system has, while consuming less processing power. The more compression means better motion estimation and more quantization. But, more quantization means less quality of the video stream, therefore the only option left seems to improve the motion estimation. However, the better motion estimation the more processing power is needed. Thus, it seems almost impossible to achieve both goals simultaneously.

If one carefully analyzes the situation, one would recognize that the motion estimation is performed before DCT and quantization are done, so in the case when input and output pictures have the same spatial resolution, the original motion vectors would remain optimal if they were optimal in the first place. The problem is to make sure that all of them are 100% optimal. Usually they are not.

In the prior art, one way to deal with this problem is to improve original vectors by classification and refinement. This is the technique used to classify original motion vectors according to some criteria and to make a decision which of them are good enough to be reused subject to small refinement, and which of motion vectors are to be replaced completely.

If this is the case, as discussed in the paper "Motion Vector Refinement for High-Performance Transcoding" by J. Young, Ming-Ting Sun, and Chia-Wen Lin in the IEEE Transaction on Multimedia, Vol. 1, No. 1, March 1999, on page 30, the processing power is saved because it is used only for processing of a small subset of all motion vectors. In this paper, the optimality of an original motion vector is evaluated by performing the refinement scheme. In the refinement scheme, the optimal motion vector is obtained by refining the incoming motion vector within a small range of incoming motion vectores and by calculating how much gain it achieves in terms of MAD—mean average difference. However, this is a highly subjective step because such gain depends on amount of motion in the video source, and no specific value can be used as a natural threshold.

What is needed is to perform the classification job by comparing different motion vectors between themselves. Indeed, if this is the case, if one has a set of neighboring vectors pointed to the same direction, this suggests that those motion vectors do correlate to the physical moving object that had been found by the original encoder. Therefore, these vectors can be considered optimal with a higher degree of probability than otherwise.

SUMMARY OF THE INVENTION

To address the shortcomings of the available art, the present invention discloses a new optimization scheme that allows to use the most relevant recovered from the original video stream original motion vectors in order to obtain in real time the optimized and most relevant motion vectors for the reconstructed video stream.

One aspect of the present invention is directed to a method of bandwidth scaling of a compressed video stream. In one embodiment, the method comprises the main steps (A) and (B).

At step (A), an original previously compressed video stream image having a first level of compression including a first level of quantization is decompressed. The original video stream comprises a set of original motion pictures, wherein each original video stream image comprises a set of original macro blocks further comprising a set of I source pictures, a set of P source pictures, and a set of B source pictures. The decompressed video stream image comprises a set of decompressed motion pictures, wherein each decompressed video stream image includes a set of decompressed macro further comprising a set of I decompressed pictures, a set of P decompressed pictures, and a set of B decompressed pictures.

More specifically, the step (A) further includes the following substeps. At the first substep (A1), a set of original motion vectors for each P source picture and each B source picture is recovered and saved. At substep (A2), reconstructed original video stream is recovered. The reconstructed original video stream differs from the original video stream by an amount of information lost during an original compression process of the original video stream. The reconstructed original video stream comprising a set of reconstructed original macro blocks further comprises a set of I reconstructed source (RS) pictures, a set of P reconstructed source (RS) pictures, and a set of B reconstructed source (RS) pictures.

At step (B), the decompressed video stream image is re-compressed to create a re-compressed video stream image having a second level of compression including a second level of quantization. The re-compressed video stream image comprises a set of re-compressed motion pictures. The re-compressed video stream image comprises a set of re-compressed macro blocks further comprising a set of I destination pictures, a set of P destination pictures, and a set of B destination pictures. In the preferred embodiment, the second level of compression is higher than the first level of compression, and the second level of quantization is stronger than the first level of quantization.

The step (B) further comprises the following substeps. At the first substep (B1), the set of recovered and saved original motion vectors is processed for each P source picture and each B source picture in order to create a set of usable source motion vectors for each P destination picture and each B destination picture.

At substep (B2), an interframe redundancy is removed from each P reconstructed source (RS) picture and from each B reconstructed source (RS) picture by using the set of usable source motion vectors. In each I (RS) picture the values of a set of pixels is independently provided. In each P (RS) picture, only the incremental changes in each pixel value from a preceding I (RS) picture or a preceding P (RS) picture are coded. In each B (RS) picture, a set of pixel values are coded with respect to both an earlier I (RS)/or P (RS) picture, and a later I (RS)/or P (RS) picture.

Next, at substep (B3), the intraframe redundancy is removed by performing a 2-dimensional discrete cosine transform (DCT) on a plurality of 8×8 values matrices to map the spatial luminance or chrominance values into the frequency domain.

At the next substep (B4), a quantization process having the second level of quantization of each DCT coefficients is performed by weighting each element of each 8×8 matrix in accordance with its chrominance or luminance type and its frequency.

At substep (B5), a run length coding for each weighted element of each 8×8 matrix is performed. The run length coding is a lossless process wherein each 8×8 matrix is represented as as an ordered list of a "DC" value, and alternating pairs of a non-zero "AC" value and a length of zero elements following the non-zero "AC" value.

Finally, at substep (B6), an entropy encoding scheme for each (RS) video stream is performed in order to further compress the representations of each DC block coefficient and each AC value-run length pairs using variable length codes. Thus, each original de-compressed video stream is re-compressed by using the set of reusable source motion vectors.

In the preferred embodiment of the present invention, the set of N1 motion vectors that substantially points out to a camera movement within at least one P/B source picture is determined by global frame processing of the set of all saved original motion vectors for each P source picture and each B source picture.

In one embodiment of the global frame processing, in the set N1 of motion vectors, for each pair comprising a first motion vector from the set of N1 motion vectors, and a second motion vector from the set of N1 motion vectors, a distance between the first motion vector and the second motion vector is checked whether it is less than a first predetermined value. In an alternative embodiment, in the subset N1 of motion vectors, a distance between each motion vector and the median value (or, in another embodiment, an average value) of a motion vector from the set N of motion vectors is checked whether it is less than the first predetermined value. N is an integer greater or equal to the first predetermined number $N_{threshold}^1$: $N \geq N1 \geq N_{threshold}^1$; N1 is an integer; $N_{threshold}^1$ is an integer. In one embodiment, the camera movement is detected if the number N1 of motion vectors is greater than N/2.

In one embodiment, the set of N1 motion vectors that substantially points out to a camera movement within at least one P/B source picture is further optimized by performing a narrow search in a narrow search area adjacent to the reference area in the reference picture. In one embodiment, the maximum size of the narrow search area is determined by the size of 5×5 macro block area centered around the original motion vector. In an alternative embodiment, the maximum size of the narrow search area is determined by the size of 7×7 macro block area centered around the original motion vector.

In one embodiment, the set of remaining (N−N1) motion vectors is also optimized by performing a full search in a search area adjacent to the reference area in the reference picture in order to find an optimum motion vector that points out to an optimum matching macro block in the reference picture for each macro block in the P/B source picture. The size of the full search area depends on the amount of available processing power.

In the preferred embodiment of the present invention, the set of N2 motion vectors that substantially points out to at least one moving object within at least one P/B source picture is also determined. It is done by local frame processing of the set N of all saved original motion vectors for each P source picture and each B source picture.

In one embodiment of the local frame processing, in the subset N2 motion vectors, for a pair comprising a first motion vector from the subset of N2 motion vectors, and a second motion vector from the subset of N2 motion vectors, a distance between the first motion vector and the second motion vector is checked whether it is less than a second predetermined value. N2 is an integer greater or equal to the second predetermined number $N_{threshold}^2$: $N2 \geq N_{threshold}^2$; $N_{threshold}^2$ is an integer. If this is the case, the pair of motion vectors belongs to the subset of all $N_{moving\_object}$ of motion vectors. By repeating this process, subset of all $N_{moving\_object}$ of motion vectors that substantially points out to substantially all moving objects within at least one P/B source picture is recovered. $N_{moving\_object}$ is an integer less or equal to N.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings.

FIG. 1 depicts a bandwidth scaler of a compressed video stream that constitutes the subject matter of the present invention.

FIG. 2 illustrates a typical group of pictures in the display order.

FIG. 3 shows the group of pictures of FIG. 2 in the coding order.

FIG. 4 depicts the MPEG macro block.

FIG. 5 illustrates a slice structure in an MPEG picture.

FIG. 6 shows as example of motion compensation prediction and reconstruction.

FIG. 7 depicts the zigzag scanning order of DCT coefficients.

FIG. 8 illustrates the decoder of FIG. 1 being implemented using as an application specific integrated circuit (ASIC) including a reconstruction module, a decoder controller, and a VLC decoder.

FIG. 9 illustrates the reconstruction module of FIG. 8 in more details.

FIG. 10 depicts the encoder of FIG. 1 being implemented as an application specific integrated circuit (ASIC) including the reconstruction module of FIG. 9, an encoder controller, and a VLC encoder.

FIG. 11 shows the processor of FIG. 1 being implemented as an application specific integrated circuit (ASIC).

FIG. 12 depicts a full search process using a search window that allows to find the best match between a motion vector and a corresponding block.

FIG. 13A illustrates a narrow search process with the maximum size of the narrow search area determined by the size of 5×5 macro block area centered around the original motion vector.

FIG. 13B shows a narrow search process with the maximum size of the narrow search area determined by the size of 7×7 macro block area centered around the original motion vector.

FIG. 14 illustrates how the bandwidth scaler of FIG. 1 changes quantization levels for I, P, and B pictures.

FIG. 15 depicts a flowchart of the method of bandwidth scaling of a compressed video stream of the present invention.

FIG. 16 is a flowchart that illustrates in further details the step of re-compressing the decompressed video stream image.

FIG. 17 depicts a flowchart that shows in more details the step of further processing the set of saved original motion vectors for each P source picture and each B source picture.

FIG. 18 illustrates the flow chart of the Narrow Search that is performed to optimize the set of recovered original motion vectors.

FIG. 19 is a flow chart of the step of global processing of original saved motion vectors shown in further details.

FIG. 20 illustrates a flowchart of the full search performed to optimize the set of recovered motion vectors.

FIG. 21 illustrates the flowchart of the proprietary algorithm for the local frame processing of the received set N2 of motion vectors, whereas each motion vector from this set substantially points out to at least one moving object.

FIG. 22 is a flow chart of the method of the present invention for re-compressing the de-compressed original video stream, wherein the differences between the quantization level for each pair comprising a I source picture and a corresponding I destination picture; and for each pair comprising a P source picture and a corresponding P destination picture is reduced as compared with the difference between the second and first quantization levels.

DETAILED DESCRIPTION OF THE PREFERRED AND ALTERNATIVE EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

FIG. 1 depicts a bandwidth scaler 10 of an originally compressed video stream 12 that constitutes the subject matter of the present invention. In the preferred embodiment, the bandwidth scaler 10 further comprises a decoder 18 and an encoder 20. The decoder 18 is configured to decompress an original previously compressed video stream image 12 having a first level of compression including a first level of quantization.

In one embodiment, the original video stream image 12 (a source image) has been previously compressed using one of the Motion Picture Experts Group (MPEG) standards, including MPEG-1 or MPEG-2 (for higher bit rate applications); MPEG-4 (for very low bit rate applications); H.261 (developed for more aggressive applications operating at p×64 kbits/s for p=1, . . . , 30); or H.263 (developed for video coding for low bitrate communications).

The following discussion can be found in "MPEG video compression standard" by Joan L. Mitchell, William B. Pennebaker, Chad. E. Fogg, and Didier J. LeGall, published by Kluwer Academic Publishers Group in 1996. The material found in "MPEG video compression standard" and deemed to be helpful in explanation of the present invention is incorporated herein by reference.

The outermost layer of an MPEG video bitstream is the video sequence layer that is self-contained and independent from other video (and audio) bitstreams. FIG. 2 depicts a typical group of pictures in display order. Each video sequence 50 is divided into one or more groups of pictures, and each group of pictures is composed of one or more pictures of three different types, I-(intra-coded pictures) 52, P-(predictive-coded pictures) 56, and B-(bidirectionally predictive-coded pictures) 54. I-pictures are coded independently, entirely without reference to other pictures. P- and B-pictures are compressed by coding the difference between the picture and reference I- or P-pictures thus using similarities from one picture to the next. A single P-picture may obtain predictions from temporally preceding I- or P-pictures in the sequence, or different regions of a single P-picture may use different predictions from preceding pictures or use no predictions. A single B-picture may obtain predictions from the nearest preceding and/or upcoming I- or P-pictures in the sequence, or different regions of a single B-picture may use different predictions from preceding pictures, upcoming pictures, both, or neither. The region of the P- or B-picture that does not use predictions is coded by intra techniques only. In a closed group of pictures P- and B-pictures are predicted only from other pictures in the same group, whereas in an open group of pictures, P- and B-picture are predicted from pictures in the same open group, or from the pictures outside the open group of pictures.

Since MPEG sometimes uses information from future pictures in the sequence, the coding order, that is the order in which compressed pictures are found in the bitstream and should be decoded by the decoder (as shown in FIG. 3), might be different from the display order (as depicted in FIG. 2), that is the order in which picture are presented to a viewer.

The basic building block of an MPEG picture is the macro block 70 shown in FIG. 4. The macro block 72 includes a 16×16 sample array of luminance samples 72 together with one 8×8 block of samples for each of two chrominance components 74 and 76.

However, the MPEG picture is not simply an array of macro blocks. As shown in FIG. 5, the MPEG picture includes a plurality of slices, whereas each slice 80 is a contiguous sequence of macro blocks 84 in raster scan order, starting at a specific address or position in the picture specified in the slice header. Each small block 82 in the FIG. 5 represents a macro block, and contiguous macro blocks 84 in a given slice 80 have the same shade of gray.

The discrete cosine transform (DCT) is used in both intra and inter coding in MPEG. DCT decomposes a block of data into a weighted sum of spatial frequencies. Each of the spatial frequency has a corresponding coefficient, or amplitude, that represents the contribution of this particular spatial frequency in the block of data being analyzed.

A DCT coefficient (or amplitude) can be further processed to selectively discard the data that the human eye cannot readily perceive. This can be done by dividing a DCT coefficient by a nonzero positive integer called a quantization value and rounding the quotient, that is the quantized DCT coefficient, to the nearest integer. The bigger the quantization value, the lower the precision is for the quantized DCT coefficient. Lower precision coefficients can be transmitted to a decoder with fewer bits. Thus, the usage of large quantization values for high spatial frequencies allows the encoder to selectively discard high spatial frequency activity that the human eye cannot perceive.

The DCT has several advantages from the point of view of data compression. First, for intra coding, the DCT coefficients are almost completely decorrelated, and therefore, can be coded independently. It allows to design a relatively simple algorithm (called a coding model) for DCT coefficients intraframe coding.

For interframe coding, the DCT does not greatly improve the decorrelation, because the difference signal obtained by subtracting the prediction from a similar (i. e, correlated) picture is already well decorrelated. However, the quantization is a powerful tool for controlling bitrate, even if decorrelation is not improved very much by the DCT.

If there is motion in the sequence, a better prediction is often obtained by coding differences to areas that are shifted with respect to the area being coded, a process known as motion compensation. The process of determining the motion vectors in the encoder is called motion estimation. The motion vectors describing the direction and amount of motion of the macro blocks are transmitted to the decoder as part of the bitstream. The decoder then knows which area of the reference picture was used for each prediction, and sums the decoded difference with this motion compensation prediction to obtain the output. The encoder should follow the same procedure when the reconstructed picture is used for predicting other pictures. FIG. 6 shows as example 90 of motion compensation prediction and reconstruction. The motion vectors and corresponding vertical and horizontal displacements are shown for forward 102 and backward 100 motion compensation. The motion vectors are the same for every picture element (or pel, or pixel) in the macro block, and vectors precision is either to full pel or half-pel accuracy.

The quantized DCT coefficients are coded losslessly, such that the decoder can reconstruct precisely the same values. For MPEG, an approximately optimal coding technique based on Huffman coding was used to generate the tables of variable length codes needed for this task. Variable length codes are needed to achieve good coding efficiency, as very short codes should be used for the highly probable events. The coefficients are arranged according to 1-D sequence known as the zigzag scanning order as depicted in FIG. 7. The zigzag scan approximately orders the coefficients in ascending spatial frequency. Since visually-weighted quantization strongly de-emphasizes higher spatial frequencies, only a few lower-frequency coefficients are nonzero in a typical transformation. The more zero coefficients, the better the compression.

The DCT is used to code both non-intra and intra picture information, but properties are quite different in the two coding environments. Different quantization tables are used for non-intra compression, and the rounding is done differently.

The MPEG is a highly asymmetric system. Indeed, the decoder follows the directions encoded in the bitstream, and is a relatively simple. An encoder, on the other hand, is much more complex than the decoder and should have more intelligence. For instance, the encoder should identify areas in motion, determine optimal motion vectors, control bitrate, control data buffering to prevent the underflow or overflow from happening, determine when to change quantization, and to vary all these parameters dynamically so as to maximize quality for a given bit rate.

Referring still to FIG. 1, the present invention is focused on bandwidth scaling of an originally compressed video stream by decompressing, recovering, processing and reusing the most relevant motion vectors, and further recompressing the reconstructed video stream.

In one embodiment, the original video stream 12 comprises a set of original motion pictures. As was explained above, the original video stream image 12 comprises a set of original macro blocks further comprising a set of I source pictures, a set of P source pictures, and a set of B source pictures.

In the preferred embodiment, the decoder 18 includes a block 22 configured to recover and to save a set of original motion vectors for each P source picture and for each B source picture. In one embodiment, the decoder also includes a block 24 configured to generate a reconstructed video stream 26 that differs from the original video stream 12 by an amount of information lost during an original compression process of the original video stream (not shown). More specifically, the decompressed video stream image 26 comprises a set of decompressed macro blocks further comprising a set of I decompressed pictures, a set of P decompressed pictures, and a set of B decompressed pictures. The reconstructed original video stream 26 comprises a set of reconstructed original macro blocks further comprising a set of I reconstructed source (RS) pictures, a set of P reconstructed source (RS) pictures, and a set of B reconstructed source (RS) pictures.

In one embodiment of the present invention, the decoder 18 of FIG. 1 is implemented using a general purpose computer loaded with a specifically designed software program. By executing the steps of this program, the decoder 18 performs the following functions: (A1) recovering and saving a set of original motion vectors for each P source picture and for each B source picture; and (A2) recovering a reconstructed original video stream comprising a set of reconstructed original macro blocks further comprising a set of I reconstructed source (RS) pictures, a set of P reconstructed source (RS) pictures, and a set of B reconstructed source (RS) pictures.

In another embodiment of the present invention, the decoder 18 of FIG. 1 is implemented using an application specific integrated circuit (ASIC) 120 as depicted in FIG. 8. The reconstruction module 130 is the central block of the decoder, as well as an encoder (see discussion below). The motion displacement and DCT data are decoded in the VLC decoder 124. FIG. 9 illustrates the reconstruction module 130 that is used by both encoders and decoders in more details. The reconstruction module 130 includes a dequantizer unit 148, a DC Pred. unit 146 configured to reconstruct the DC coefficient in intra-coded macro blocks, and an IDCT unit 144 for calculating the inverse DCT. The prediction signal 143 is calculated from the data in the picture store & prediction calculation unit 142 including the forward motion vectors 141 and backward motion vectors 143. The prediction signal 145 is also compensated for forward and backward motion displacements. The IDCT output signal 145 is combined with the prediction signal 143 to form the reconstruction signal 147 (or the reconstructed signal 26 of FIG. 1). Thus the decoder 18 of FIG. 1 implemented as the decoder 120 of FIG. 8, generates the reconstructed original video signal 26 and also recovers and stores the original motion vectors.

Referring still to FIG. 1, the encoder block 20 utilizes the reconstructed original signal 26 and the set of recovered and stored original motion vectors to generate the re-compressed video stream 16 having a second level of compression including a second level of quantization.

In the preferred embodiment, the second level of compression is higher than the first level of compression, and the second level of quantization is stronger than the first level of quantization. The re-compressed video stream image 16 comprises a set of re-compressed motion pictures comprising a set of re-compressed macro blocks. The set of re-compressed macro blocks further comprises a set of I destination pictures, a set of P destination pictures, and a set of B destination pictures.

In one embodiment of the present invention, the encoder 20 of FIG. 1 is implemented using a general purpose computer loaded with a specifically designed software program. By executing the steps of this program, the decoder 20 performs the following functions:

(B1) processing the set of recovered and saved original motion vectors for each P source picture and each B source picture in order to create a set of usable source motion vectors for each P destination picture and each B destination picture;

(B2) removing an interframe redundancy from each P (RS) picture and from each B (RS) picture by using the set of usable source motion vectors, wherein the values of a set of pixels in each I (RS) picture is independently provided, and wherein in each P (RS) picture, only the incremental changes in each pixel value from a preceding I (RS) picture or a preceding P (RS) picture are coded, and wherein in each B (RS) picture, a set of pixel values are coded with respect to both an earlier I (RS)/or P (RS) picture, and a later I (RS)/or P (RS) picture;

(B3) removing intraframe redundancy by performing a 2-dimensional discrete cosine transform (DCT) on a plurality of 8×8 values matrices to map the spatial luminance or chrominance values into the frequency domain;

(B4) performing a quantization process having the second level of quantization of each DCT coefficients by weighting each element of each 8×8 matrix in accordance with its chrominance or luminance type and its frequency;

(B5) performing a run length coding for each weighted element of each 8×8 matrix without information loss as an ordered list of a "DC" value, and alternating pairs of a non-zero "AC" value and a length of zero elements following the non-zero "AC" value; wherein each element of one matrix is presented as if the matrix is read in a zigzag manner; and (B6) performing an entropy encoding scheme for each (RS) video stream in order to further compress the representations of each DC block coefficient and each AC value-run length pairs using variable length codes.

In another embodiment of the present invention, the encoder 18 of FIG. 1 is implemented using an application specific integrated circuit (ASIC) 160 as depicted in FIG. 10. In this embodiment, the encoder 18 (of FIG. 1) includes the following blocks. At first, the encoder 18 includes the processor block 28 configured to process the set of recovered and saved original motion vectors for each P source picture and each B source picture in order to create a set of usable source motion vectors for each P destination picture and each B destination picture.

In one embodiment of the present invention, the encoder 20 further includes the interframe redundancy block 30 configured to remove an interframe redundancy from each P (RS) picture and from each B (RS) picture by using the set of usable source motion vectors saved in the block 22 of the decoder 18. The values of a set of pixels in each I (RS) picture are independently provided. In each P (RS) picture, only the incremental changes in each pixel value from a preceding I (RS) picture or a preceding P (RS) picture are coded. In each B (RS) picture, a set of pixel values are coded with respect to both an earlier I (RS)/or P (RS) picture, and a later I (RS)/or P (RS) picture.

In one embodiment of the present invention, the encoder 20 further includes the intraframe redundancy block 32 configured to remove intraframe redundancy by performing a 2-dimensional discrete cosine transform (DCT) on a plurality of 8×8 values matrices to map the spatial luminance or chrominance values into the frequency domain; and a quantization block 34 configured to perform a quantization process having the second level of quantization of each DCT coefficients by weighting each element of each 8×8 matrix in accordance with its chrominance or luminance type and its frequency. Quantization process is also used to control and to change the bitrate of the re-computed video stream 16. Please, see discussion below.

In the preferred embodiment, the encoder 20 also includes a run length coding block 36 configured to represent without information loss each weighted element of each 8×8 matrix as an ordered list of a "DC" value, alternating pairs of a non-zero "AC" value, and a length of zero elements following the non-zero "AC" value. Each element of one matrix is presented as if the matrix is read in a zigzag manner. In this embodiment, the encoder 20 also includes an entropy encoding block 38 configured to perform an entropy encoding scheme for each (RS) video stream in order to further compress the representations of each DC block coefficient and each AC value-run length pairs using variable length codes. The resulting re-compressed video stream 16 is re-compressed using the set of reusable source motion vectors that is a subset of the set of original motion vectors recovered and saved in the block 22. See discussion below.

In one embodiment, the above mentioned blocks (28–38) of the encoder 20 of FIG. 1 can be realized by designing an ASIC having the MPEG encoder structure 160, as shown in FIG. 10. More specifically, MPEG encoder 160 includes the reconstruction block 130 (shown in more detail in FIG. 9) that is used to reconstruct the pictures needed for prediction. MPEG encoder 160 also includes a controller 162, a forward DCT 166, a quantizer unit 168, a VLC encoder 164, and a motion estimator 170. The controller 162 provides synchronization and control functions. The quantized forward DCT is computed in the FDCT 166 and Q 168 modules. The forward and backward motion estimation is carried out in the motion estimator block 170. The coding of the motion vectors and DCT data is performed in the VLC encoder 164.

As was explained above, motion compensation is a standard part of MPEG protocol, whereas motion estimation is not. Motion compensation refers to the use of motion displacements in the coding and decoding of the sequence. Motion estimation refers to the determination of the motion displacements. In the encoder the difference between source picture and prediction is coded. In the decoder the difference between source picture and prediction is decoded and added to the prediction to get the decoded output. Both encoder and decoder use the same motion displacements in determining where to obtain the prediction. However, the encoder estimates the displacements before encoding them in the bitstream, whereas the decoder just decodes the encoded in the bitstream displacements.

Motion estimation techniques primarily includes block matching techniques where a single motion vector is applied to a block of pels. When determining the optimal motion displacement of the prediction, a full search over every possible motion displacement, or motion vectors produces the best possible value, if the computational resources are available. The search algorithms are also very important.

The present invention discloses the proprietary algorithms for performing the full search and the narrow search of the most relevant motion vectors. They include the motion vectors that substantially point out to the camera movements and to the moving objects (see full discussion below). This allows one to significantly optimize the performance of the bandwidth scaler 14 of FIG. 1 of the present invention using the same amount of processing power as the prior art bandwidth scaler.

In one embodiment of the present invention, the processor 28 (of FIG. 1) is implemented using a general purpose computer loaded with a specifically designed software program. By executing the steps of this program the processor 28 performs the following functions:

(B1, 1) analyzing the set of N saved original motion vectors for one P source picture, or for one B source picture; N being an integer;

(B1, 2) if in a set of N1 of motion vectors, for each pair comprising a first motion vector from the set of N1 motion vectors, and a second motion vector from the set of N1 motion vectors, a distance between the first motion vector and the second motion vector is less than a first predetermined value, keeping the set of N1 motion vectors for further global frame processing; and disregarding a set of remaining (N−N1) motion vectors; wherein the set of N1 motion vectors substantially points out to a camera movement within at least one P/B source picture; N1 being an integer greater or equal to the first predetermined number $N_{threshold}^1$:$N \geq N1 \geq N_{threshold}^1$; N1 being an integer; $N_{threshold}^1$ being an integer;

(B1, 3) if in a subset of N2 motion vectors, wherein the subset of N2 motion vectors corresponds to a group of adjacent macro blocks comprising a set of N2 macro blocks, for each pair comprising a first motion vector from the subset of N2 motion vectors, and a second motion vector from the subset of N2 motion vectors, a distance between the first motion vector and the second motion vector is less than a second predetermined value, keeping the set of N2 motion vectors for further local frame processing; and disregarding a set of remaining (N−N2) motion vectors; wherein the set of N2 motion vectors substantially points out to at least one moving object within at least one P/B source picture; N2 being an integer greater or equal to the second predetermined number $N_{threshold}^2$:$N2 \geq N_{threshold}^2$; $N_{threshold}^2$ being an integer; and (B1, 4) repeating the step (B1, 3) to recover in the set of N motion vectors a subset of $N_{moving\_object}$ of motion vectors that substantially points out to substantially all moving objects within at least one P/B source picture; $N_{moving\_object}$ is an integer less or equal to N.

Herein the step (B1, 2) discloses the proprietary search algorithm of the present invention for the global frame processing utilized in order to recover and to re-use the motion vectors related to the camera movement. On the other hand, the step (B1, 3) discloses the proprietary search algorithm of the present invention for the local frame processing utilized in order to recover and to re-use the motion vectors related to the moving objects.

In another embodiment of the present invention, the processor 28 (of FIG. 1) is implemented using an application specific integrated circuit (ASIC) as shown in FIG. 11. In this embodiment, the processor ASIC 28 includes an analyzer 184 configured to analyze the set of N original motion vectors saved and stored by the block 22 for each P source picture, and for each B source picture. N is an integer.

In the preferred embodiment, the processor 28 further includes a Global Frame Processor 182 configured to globally process a set of N1 motion vectors and configured to disregard a set of remaining (N−N1) motion vectors. In one embodiment, the Global Frame Processor 182 further includes the Camera Movement Motion Vectors (CMMV) block 186 configured to identify the set of N1 motion vectors that substantially points out to a camera movement within at least one P/B source picture.

In one embodiment, the Global Frame Processor 182 further includes the First Threshold Test (FTT) block 188 that is used to select the set of N1 motion vectors that substantially points out to a camera movement within at least one P/B source picture. The set of N1 motion vectors is selected from the set N of original motion vectors based on the following criteria (implemented as the FTT 188):

Whether for each pair comprising a first motion vector from the set of N1 motion vectors and a second motion vector from the set of N1 motion vectors, a distance between the first motion vector and the second motion vector is less than a first predetermined value $N_{threshold}^1$; N1 is an integer greater or equal to the first predetermined number $N_{threshold}^1$:$N \geq N1 \geq N_{threshold}^1$; $N_{threshold}^1$ is an integer.

Referring still to FIG. 11, in the preferred embodiment of the present invention, the Global Frame Processor 182 further includes: a Global Narrow Search (GNS) block 190 configured to optimize the set of N1 motion vectors stored in the CMMV block 186 that substantially points out to the camera movement within at least one P/B source picture by performing a narrow search in a narrow search area adjacent to the reference area in the reference picture.

In the preferred embodiment of the present invention, the Global Narrow Search includes the following steps:

(A) identifying a set of macro blocks corresponding to the set of N1 motion vectors in the P/B source picture;

(B) identifying a reference area in a reference picture corresponding to one macro block in the P/B source picture;

(C) identifying the maximum size of the narrow search area.

In one embodiment, as shown in FIG. 13A, the maximum size of the narrow search area 232 is determined by the size of 5×5 macro block area centered around the original motion vector 234. In an alternative embodiment, as depicted ion FIG. 13B, the maximum size of the narrow search area 242 is determined by the size of 7×7 macro block area centered around the original motion vector 244.

In the preferred embodiment of the present invention, the Global Frame Processor 182 further includes: a Global Full Search (GFS) block 192 configured to optimize the set of remaining (N−N1) motion vectors by performing a full search in a search area adjacent to the reference area in the reference picture in order to find an optimum motion vector that points out to an optimum matching macro block in the reference picture for each macro block in the P/B source picture. FIG. 12 depicts a full search process using a search window 220 that allows to find the best match between a motion vector 218 and a corresponding block 216. The size of the full search area depends on the amount of available processing power.

Referring still to FIG. 11, in the preferred embodiment of the present invention, the Processor 28 further includes a Local Frame Processor 180 configured to locally process a set of N2 motion vectors corresponding to a group of adjacent macro blocks comprising a set of N2 macro blocks. The Local Frame Processor 180 further includes a Second Threshold Test (STT) block 194 that is used to select the set of N2 motion vectors that substantially points out to at least one moving object within at least one P/B source picture. The STT block 194 includes the following test condition:

Whether for each pair comprising a first motion vector from the set of N2 motion vectors and a second motion vector from the set of N2 motion vectors, a distance between the first motion vector and the second motion vector is less than a second predetermined value; N2 is an integer greater or equal to the second predetermined number $N_{threshold}^2 : N2 \geq N_{threshold}^2$; $N_{threshold}^2$ is an integer.

The Local Frame Processor 180 further includes the Moving Objects Motion Vectors (MOMV) block 200 that stores the set of N2 motion vectors including a set of substantially all $N_{moving\_object}$ motion vectors, whereas the set of $N_{moving\_object}$ of motion vectors includes each motion vector that substantially points out to at least one moving object within at least one P/B source picture. $N_{moving\_object}$ is an integer less or equal to N.

In the preferred embodiment of the present invention, the Local Frame Processor 180 further includes a Local Narrow Search (LNS) block 198 configured to optimize stored in block MOMV 200 set of $N_{moving\_object}$ of motion vectors that substantially points out to substantially all moving objects within at least one P/B source picture by performing a narrow search in a narrow search area adjacent to the reference area in the reference picture. In the preferred embodiment of the present invention, Local Narrow Search (LNS) includes the following steps:

(A) identifying a set of macro blocks corresponding to the set of $N_{moving\_object}$ motion vectors in the P/B source picture;

(B) identifying for each original macro block in the P/B source picture a reference area in a reference picture that corresponding to the macro block;

(C) identifying the maximum size of the narrow search area.

In one embodiment, as shown in FIG. 13A, the maximum size of the narrow search area 232 is determined by the size of 5×5 macro block area centered around the original motion vector 234. In an alternative embodiment, as depicted ion FIG. 13B, the maximum size of the narrow search area 242 is determined by the size of 7×7 macro block area centered around the original motion vector 244.

In an alternative embodiment, the Local Frame Processor 180 further includes a Local Full Search (LFS) block 196 configured to optimize stored in block MOMV 200 set of $N_{moving\_object}$ of motion vectors that substantially points out to substantially all moving objects within at least one P/B source picture by performing a full search (as shown in FIG. 12) in a search area adjacent to the reference area in the reference picture. The size of the full search area depends on the amount of available processing power. In the preferred embodiment of the present invention, Local Full Search (LFS) includes the following steps:

(A) identifying a set of macro blocks corresponding to the set of $N_{moving\_object}$ motion vectors in the P/B source picture;

(B) identifying a reference area in the reference picture that corresponds to each macro block in the P/B source picture.

In the preferred embodiment of the present invention, the Local Frame Processor 180 (of FIG. 11) includes a programmable chip including the following algorithm:

(A) starting with an arbitrary motion vector א belonging to the set of N of motion vectors; wherein the arbitrary motion vector א corresponds to at least one macro block α;

(B) comparing the א motion vector with a motion vector ב belonging to a set of 8 neighboring motion vectors; wherein each neighboring motion vector ב corresponds to at least one macro block β adjacent to the macro block α;

(C) if a distance between the arbitrary motion vector א and at least one neighboring motion vector ב is less than the second predetermined value, marking each motion vector ב as a motion vector ד belonging to a set $N_{moving\_object}$;

(D) replacing the arbitrary motion vector א with one motion vector ד belonging to the set $N_{moving\_object}$;

(E) repeating the steps (B–D) until the set $N_{moving\_object}$ stops growing.

As depicted in FIG. 14, in one embodiment of the present invention, the bandwidth scaler 254 further includes a subprocessor 253 configured to reduce the differences of the quantization level for each pair of P source picture 268, 294/corresponding P destination picture 312, 260 at a first predetermined amount. In one embodiment of the present invention, this is done by using the Q-block 168 of the encoder 160 (that is a part of the bandwidth scaler 254 of FIG. 14) as shown in FIG. 10.

In one embodiment, the quantizer Q-block 168 comprises a maximum-a posteriori (MAP) quantizer for transcoding (not shown) that specifies the reduced quantization level for each pair of P source picture/corresponding P destination picture.

In one embodiment of the present invention, as shown in FIG. 14, the bandwidth scaler 254 further includes a subprocessor 255 configured to reduce the differences of the quantization level for each pair of I source picture 258/corresponding I destination picture 296 at a second predetermined amount. In one embodiment of the present invention, the quantizer Q-block 168 of the encoder 160 does this job. In one embodiment, the quantizer Q-block 168 comprises a MAP quantizer for transcoding (not shown) that sets the reduced quantization level for each pair of I source picture/corresponding I destination picture.

To preserve the second compression level, in one embodiment of the present invention, as shown in FIG. 14, the bandwidth scaler 254 further includes a subprocessor 257 configured to increase the quantization level for each destination B picture 304, 306, 320, and 322 at a third predetermined amount to compensate for the reduction in the quantization level for each pair of I source picture/corresponding I destination picture, and for each pair of P source picture/corresponding P picture. In one embodiment of the present invention, the quantizer Q-block 168 of the encoder 160 further comprises a MAP quantizer for transcoding (not shown) that sets the increased quantization level for each destination B picture to compensate for the reduction in the quantization level for each pair of I source picture/corresponding I destination picture, and for each pair of P source picture/corresponding P picture.

The reduction of the differences of the quantization level for each pair comprising the I source picture and the corresponding I destination picture by the first predetermined amount; and for each pair comprising the P source picture and the corresponding P destination picture by the second predetermined amount reduces the propagation of errors caused by re-using a plurality of motion vectors originally used for a plurality of source pictures compressed at the first quantization level for a plurality of destination pictures compressed at the second quantization level.

If the difference between the original bitrate for the originally compressed video stream 252 (of FIG. 14) and the target bitrate for the re-compressed reconstructed video stream 256 (of FIG. 14) is high as compared with a predetermined criteria, in one embodiment of the present invention, a narrow search (as shown in FIGS. 13A&B) around the original motion vector (that is not part of the camera movement motion vectors, and is not part of the moving object motion vectors), is performed to find a more suitable motion vector. In an alternative embodiment, if there is enough computing power, a full search (as shown in FIG. 12) around the original motion vector is performed to find a more suitable motion vector.

Another aspect of the present invention is directed to the method of bandwidth scaling of a compressed video stream, as shown in FIG. 15. The original video stream comprises a set of original motion comprising a set of original macro blocks. The set of original macro blocks further comprises a set of I source pictures 258, a set of P source pictures 268, 294, and a set of B source pictures 264, 266, 292, 290, as shown in FIG. 14. The decompressed video stream image comprises a set of decompressed motion pictures comprising a set of decompressed macro blocks. The set of decompressed macro blocks further comprises a set of I decompressed pictures, a set of P decompressed pictures, and a set of B decompressed pictures (not shown).

In one embodiment, the method of the bandwidth scaling of the present invention is illustrated by flowchart 340 of FIG. 15 comprising the following main steps: step 342 of decompressing an original previously compressed video stream image having a first level of compression including a first level of quantization, and step 344 of re-compressing the decompressed video stream image to create a re-compressed video stream image having a second level of compression including a second level of quantization. In the preferred embodiment of the present invention, the second level of compression is higher than the first level of compression, and the second level of quantization is stronger than the first level of quantization. The re-compressed video stream image comprises a set of re-compressed motion pictures comprising a set of re-compressed macro blocks. The set of re-compressed macro blocks further comprises a set of I destination pictures 296, a set of P destination pictures 312, 260, and a set of B destination pictures 304, 306, 320, 322, as shown in FIG. 14.

In one embodiment of the present invention, as shown in FIG. 15, the step 342 of decompressing the original compressed video stream further comprises the following steps: step 346 of recovering and saving a set of original motion vectors for each P source picture and each B source picture; and step 348 of recovering a reconstructed original video stream. The reconstructed original video stream comprises a set of reconstructed original macro blocks further comprising a set of I reconstructed source (RS) pictures, a set of P reconstructed source (RS) pictures, and a set of B reconstructed source (RS) pictures.

Each recovered original motion vector substantially points out to at least one macro block in the original video stream. However, the reconstructed original video stream differs from the original video stream by an amount of information lost during an original compression process of the original video stream. Therefore, the recovered motion vectors from the original video stream should be optimized to substantially point out to the marco blocks in the reconstructed original video stream.

In one embodiment of the present invention, as depicted in FIG. 16, the step 344 (of FIG. 15) of re-compressing the decompressed video stream image to create the re-compressed video stream image further comprises the following steps. Step 364 is the step of processing the set of recovered and saved original motion vectors for each P source picture and each B source picture in order to create a set of usable source motion vectors for each P destination picture and each B destination picture. This step is crucial because some of the recovered motion vectors should be re-used in the present invention in order to save the processing power.

At the next step 366 an interframe redundancy from each P (RS) picture and from each B (RS) picture is removed by using the set of usable source motion vectors, and at the step 368 the intraframe redundancy is removed by performing a 2-dimensional discrete cosine transform (DCT) on a plurality of 8×8 values matrices to map the spatial luminance or chrominance values into the frequency domain. At step 370 a quantization process having the second level of quantization of each DCT coefficients is performed by weighting each element of each 8×8 matrix in accordance with its chrominance or luminance type and its frequency. At step 372 a run length coding is performed for each weighted element of each 8×8 matrix without information loss as an ordered list of a "DC" value, and alternating pairs of a non-zero "AC" value and a length of zero elements following the non-zero "AC" value. Each element of this matrix is presented as if the matrix is read in a zigzag manner. Finally, at step 374, an entropy encoding scheme for each (RS) video stream is performed in order to further compress the representations of each DC block coefficient and each AC value-run length pairs using variable length codes. Thus, each original decompressed video stream is re-compressed by using the set of reusable source motion vectors.

In one embodiment of the present invention, FIG. 17 illustrates the step 364 (of FIG. 16) of processing the set of saved original motion vectors for each P source picture and each B source picture in more details. At first (step 384), the set of N saved original motion vectors is analyzed for one P source picture, or for one B source picture. If in a set of N of motion vectors, for each pair comprising a first motion vector from the subset of N1 motion vectors, and a second motion vector from the subset of N1 motion vectors, a distance between the first motion vector and the second motion vector is less than a first predetermined value, that is, the Test condition I (386) is satisfied, then the flow chart follows the logical arrow (400). If this is the case, the next step is the step 388: the subset of N1 motion vectors is kept for further global frame processing; and the set of remaining (N−N1) motion vectors is disregarded. The set of N1 motion vectors is used for further processing because each vector from this set substantially points out to a camera movement within at least one P/B source picture. Herein, N1 is an integer greater or equal to the first predetermined number $N_{threshold}^1 : N \geq N1 \geq N_{threshold}^1$; N1 is an integer; $N_{threshold}^1$ is an integer.

If, on the other hand, in a subset of N2 motion vectors, wherein the subset of N2 motion vectors corresponds to a group of adjacent macro blocks comprising a set of N2 macro blocks, for each pair comprising a first motion vector from the subset of N2 motion vectors, and a second motion vector from the subset of N2 motion vectors, a distance between the first motion vector and the second motion vector is less than a second predetermined value, that is, the Test condition II (390) is satisfied, then the flow chart follows the logical arrow (404). If this is the case, the next step 392 is the step of keeping the set of N2 motion vectors for further local frame processing, whereas the set of remaining (N−N2) motion vectors is disregarded. The set of N2 motion vectors is kept for further processing because each vector in this set substantially points out to at least one moving object within at least one P/B source picture. Herein, N2 is an integer greater or equal to the second predetermined number $N_{threshold}^2 : N2 \geq N_{threshold}^2$; $N_{threshold}^2$ is an integer. The step 392 is preferably repeated to recover all $N_{moving\_object}$ of motion vectors that substantially points out to substantially all moving objects within at least one P/B source picture. Herein, $N_{moving\_object}$ is an integer less or equal to N.

In one embodiment, the step 388 (of FIG. 17) further includes the step of setting the distance between the first motion vector and the second motion vector to be less than 2 pixels by each coordinate. In another embodiment, the step 388 (of FIG. 17) further includes the step of setting the distance between the first motion vector and the second motion vector to be less than 10% of the first motion vector value by each coordinate. Yet, in one more embodiment, the step 388 (of FIG. 17) further includes the step of setting the distance between the first motion vector and the second motion vector to be less than 10% of the second motion vector value by each coordinate.

In one embodiment of the present invention, the step 388 of FIG. 17 further includes the step of performing a narrow search to optimize the set of N1 motion vectors substantially pointing out to the camera movement within at least one P/B source picture. In one embodiment, the narrow search (as shown in FIG. 18) further includes the following steps. After the set of macro blocks corresponding to the set of N1 motion vectors in the P/B source picture is identified (step 424), for each macro block in the picture, one original motion vector from the set of N1 motion vectors is used (step 426) to identify a reference area in a reference picture corresponding to that macro block. At the next step (428), a narrow search is performed in a narrow search area adjacent to the reference area in the reference picture in order to find an optimum motion vector that points out to an optimum matching macro block in the reference picture. Steps 426–428 are preferably repeated for each macro block in the P/B source picture. In one embodiment, the maximum size of the narrow search area is determined by the size of 5×5 macro block area centered around the original motion vector. In another embodiment, the maximum size of the narrow search area is determined by the size of 7×7 macro block area centered around the original motion vector.

In one embodiment of the present invention, as shown in FIG. 19, the step 388 (of FIG. 17) of global processing further comprises the following steps. After a first set of N1 motion vectors is selected from the set of all saved motion vectors N (step 464), in one embodiment, an average value of a motion vector from the set N of motion vectors is calculated (step 466). In this embodiment, if in the subset N1 of motion vectors, a distance between each motion vector and the average calculated value is less than the first predetermined value, that is the Test condition III is satisfied (468), the flow chart follows the logical arrow 478. If this is the case, the set of N1 motion vectors is kept for further global frame processing (step 470) because each vector in the set of N1 motion vectors substantially points out to the camera movement within at least one P/B source picture. The steps 466 and 470 are preferably repeated and, in one embodiment, the camera movement is detected if the number N1 of motion vectors is greater than N/2.

In an alternative embodiment of the present invention, as shown in FIG. 19, the step 388 (of FIG. 17) of global processing further comprises the following steps. After a first set of N1 motion vectors is selected from the set of all saved motion vectors N (step 464), a median value of a motion vector from the set N of motion vectors is calculated (step 466). In this embodiment, if in the subset N1 of motion vectors, a distance between each motion vector and the median value is less than the first predetermined value, that is the Test condition IV is satisfied (472), the flow chart follows the logical arrow 482. If this is the case, the set of N1 motion vectors is kept for further global frame processing (step 474) because each vector in the set of N1 motion vectors substantially points out to the camera movement within at least one P/B source picture. The steps 470 and 474 are preferably repeated, so that, in one embodiment, the camera movement is detected if the number N1 of motion vectors is greater than N/2.

In one embodiment, as shown in FIG. 20, the global processing further includes the full search to optimize the set of remaining (N−N1) motion vectors. In one embodiment, the full search further including the following steps. After the set of macro blocks corresponding to the set of (N−N1) motion vectors in the P/B source picture is identified (step 502), for each macro block in the picture, one motion vector from the set of (N−N1) motion vectors is used (step 504) to identify a reference area in a reference picture that corresponding to the macro block. After that, the full search is performed (step 506) in a search area adjacent to the reference area in the reference picture to find an optimum motion vector that points out to an optimum matching macro block in the reference picture. Steps 504–506 are preferably repeated for each macro block in the P/B source picture. The size of the full search area depends on the amount of available processing power.

In one embodiment of the present invention, the narrow search process, as described above, is performed to optimize the set of $N_{moving\_object}$ of motion vectors that substantially points out to substantially all moving objects within at least one P/B source picture. In another embodiment of the present invention, the full search, as described above, is performed to optimize the set of $N_{moving\_object}$ of motion vectors that substantially points out to substantially all moving objects within at least one P/B source picture.

In one embodiment of the present invention, the local frame processing of the received set N2 of motion vectors that substantially point out to at least one moving objects further includes the following proprietary algorithm, as depicted in FIG. 21.

Step 524: (A) starting with an arbitrary motion vector א belonging to the set of N of motion vectors; wherein the arbitrary motion vector א corresponds to at least one macro block α;

Step 526: (B) comparing the א motion vector with a motion vector ב belonging to a set of 8 neighboring motion vectors; wherein each neighboring motion vector ב corresponds to at least one macro block β adjacent to the macro block α;

Step 528: (C) if a distance between the arbitrary motion vector א and at least one neighboring motion vector ב is less than the second predetermined value, marking each motion vector ב as a motion vector ד belonging to a set $N_{moving\_object}$;

step 530: (D) replacing the arbitrary motion vector א with one motion vector ד belonging to the set $N_{moving\ object}$; and Step 532: (E) preferably repeating the steps (526–530) until the set $N_{moving\ object}$ stops growing.

One more aspect of the present invention, as depicted in FIG. 22, is directed to the method of re-compressing the de-compressed original video stream, wherein the differences of the quantization level for each pair comprising a I source picture and a corresponding I destination picture; and for each pair comprising a P source picture and a corresponding P destination picture is reduced as compared with the difference between the second and first quantization levels Δ in order to reduce the propagation of errors caused by reusing a plurality of motion vectors originally used for a plurality of source pictures compressed at the first quantization level for a plurality of destination pictures compressed at the second quantization level.

More specifically, FIG. 22 is a flowchart 540 having the following steps. Step 544 is the step of reducing the differences of the quantization level for each pair of a P source picture/corresponding P destination picture at a first predetermined amount, whereas step 546 is the step of reducing the differences of the quantization level for each pair of an I source picture/corresponding I destination picture at a second predetermined amount. Finally, step 548 is the step of increasing the quantization level for each destination B picture at a third predetermined amount to compensate for the reduction in the quantization level for each pair of an I source picture/corresponding I destination picture, and for each pair of an P source picture/corresponding P picture in order to preserve the second compression level.

The second compression levels should be preserved if the user would like to have the re-compressed video stream to be delivered to his terminal within a reasonable time frame in real time.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of bandwidth scaling of a compressed video stream comprising the steps of:

(A) decompressing an original previously compressed video stream image having a first level of compression including a first level of quantization, said original video stream comprising a set of original motion pictures; said original video stream image comprising a set of original macro blocks; said set of original macro blocks further comprising a set of I source pictures, a set of P source pictures, and a set of B source pictures; said decompressed video stream image comprising a set of decompressed motion pictures; said decompressed video stream image comprising a set of decompressed macro blocks; said set of decompressed macro blocks further comprising a set of I decompressed pictures, a set of P decompressed pictures, and a set of B decompressed pictures; said step (A) further comprising the steps of:

(A1) recovering and saving a set of original motion vectors for each said P source picture and each said B source picture; wherein each said original motion vector substantially points out to at least one macro block in said original video stream; and (A2) recovering a reconstructed original video stream; wherein said reconstructed original video stream differs from said original video stream by an amount of information lost during an original compression process of said original video stream; said reconstructed original video stream comprising a set of reconstructed original macro blocks; said set of reconstructed original macro blocks further comprising a set of I reconstructed source (RS) pictures, a set of P reconstructed source (RS) pictures, and a set of B reconstructed source (RS) pictures; and (B) re-compressing said decompressed video stream image to create a re-compressed video stream image having a second level of compression including a second level of quantization, wherein said second level of compression is higher than said first level of compression, and wherein said second level of quantization is stronger than said first level of quantization, said re-compressed video stream image comprising a set of re-compressed motion pictures; said re-compressed video stream image comprising a set of re-compressed macro blocks; said set of re-compressed macro blocks further comprising a set of I destination pictures, a set of P destination pictures, and a set of B destination pictures; said step (B) further comprising the steps of:

(B1) processing said set of recovered and saved original motion vectors for each said P source picture and each said B source picture in order to create a set of usable source motion vectors for each said P destination picture and each said B destination picture;

(B2) removing an interframe redundancy from each said P (RS) picture and from each said B (RS) picture by using said set of usable source motion vectors, wherein the values of a set of pixels in each said I (RS) picture is independently provided, and wherein in each said P (RS) picture, only the incremental changes in each said pixel value from a preceding I (RS) picture or a preceding P (RS) picture are coded, and wherein in each said B (RS) picture, a set of pixel values are coded with respect to both an earlier I (RS)/or P (RS) picture, and a later I (RS)/or P (RS) picture;

(B3) removing intraframe redundancy by performing a 2-dimensional discrete cosine transform (DCT) on a plurality of 8×8 values matrices to map the spatial luminance or chrominance values into a frequency domain;

(B4) performing a quantization process having said second level of quantization of each DCT coefficients by weighting each element of each said 8×8 value matrix in accordance with its chrominance or luminance type and its frequency;

(B5) performing a run length coding for each said weighted element of each said 8×8 valve matrix without information loss as an ordered list of a "DC" block coefficient; and alternating pairs of a non-zero "AC" value and a length of zero elements following said non-zero "AC" value; wherein each said element of one said matrix is presented as if said matrix is read in a zigzag manner; and (B6) performing an entropy encoding scheme for each said (RS) video stream in order to further compress the representations of each said DC block coefficient and each AC value-run length pairs using variable length codes;

wherein each said original de-compressed video stream is re-compressed by using said set of reusable source motion vectors;

wherein said step (B1) of processing said set of recovered and saved original motion vectors for each said P source picture and each said B source picture further includes the steps of:

reducing the differences of the quantization level for each pair of a P source picture/corresponding P destination picture at a first predetermined amount;

reducing the differences of the quantization level for each pair of an I source picture/corresponding I destination picture at a second predetermined amount; and increasing the quantization level for each destination B picture at a third predetermined amount to compensate for the reduction in the quantization level for each pair of an I source picture/corresponding I destination picture, and for each pair of a P source picture/corresponding P destination picture in order to preserve said second compression level;

wherein said reduction of the differences of the quantization level for each pair comprising an I source picture and a corresponding I destination picture by said first predetermined amount; and for each pair comprising a P source picture and a corresponding P destination picture by said second predetermined amount reduces the propagation of errors caused by re-using a plurality of motion vectors originally used for a plurality of source pictures compressed at said first quantization level for a plurality of destination pictures compressed at said second quantization level.

2. The method of claim 1, wherein said step (B1) of processing said set of saved original motion vectors for each said P source picture and each said B source picture further includes the steps of:

(B1, 1) analyzing said set of N saved original motion vectors for one said P source picture, or for one said B source picture; N being an integer;

(B1, 2) if in a subset of N1 of motion vectors, for each pair comprising a first motion vector from said set of N1 motion vectors, and a second motion vector from said set of N1 motion vectors, a distance between said first motion vector and said second motion vector is less than a first predetermined value, keeping said set of N1 motion vectors for further global frame processing; and disregarding a set of remaining (N−N1) motion vectors; wherein said set of N1 motion vectors substantially points out to a camera movement within at least one said P/B source picture; N1 being an integer greater or equal to a first predetermined number $N_{threshold}^1$: $N_{threshold}^1 \geq N1 \geq N_{threshold}^1$; N1 being an integer; $N_{threshold}^1$ being an integer;

(B1, 3) if in a subset of N2 motion vectors, wherein said subset of N2 motion vectors corresponds to a group of adjacent macro blocks comprising a set of N2 macro blocks, for each pair comprising a first motion vector from said subset of N2 motion vectors, and a second motion vector from said subset of N2 motion vectors, a distance between said first motion vector and said second motion vector is less than a second predetermined value, keeping said subset of N2 motion vectors for further local frame processing; and disregarding a set of remaining (N−N2) motion vectors; wherein said subset of N2 motion vectors substantially points out to at least one moving object within at least one said P/B source picture; N2 being an integer greater or equal to a second predetermined number $N_{threshold}^2$: $N2 \geq N_{threshold}^2$; $N_{threshold}^2$ being an integer; and (B1, 4) repeating said step (B1, 3) to recover in said set of N motion vectors a subset of $N_{moving\_object}$ of motion vectors that substantially points out to substantially all moving objects within at least one said P/B source picture; $N_{moving\_object}$ is an integer less or equal to N.

3. The method of claim 2, wherein said step of (B1, 2) further includes the step of:

setting said distance between said first motion vector and said second motion vector to be less than 2 pixels by each coordinate.

4. The method of claim 2, wherein said step of (B1, 2) further includes the step of:

setting said distance between said first motion vector and said second motion vector to be less than 10% of said first motion vector value by each coordinate.

5. The method of claim 2, wherein said step of (B1, 2) further includes the step of:

setting said distance between said first motion vector and said second motion vector to be less than 10% of said second motion vector value by each coordinate.

6. The method of claim 2, wherein said step (B1, 2) further includes the step of performing a narrow search to optimize said set of N1 motion vectors substantially pointing out to said camera movement within at least one said P/B source picture further including the steps of:

(A) identifying a set of macro blocks corresponding to said set of N1 motion vectors in said P/B source picture;

(B) for one said macro block in said picture, using one said original motion vector from said set of N1 motion vectors to identify a reference area in a reference picture that corresponding to said macro block;

(C) performing a narrow search in a narrow search area adjacent to said reference area in said reference picture to find an optimum motion vector that points out to an optimum matching macro block in said reference picture; wherein the maximum size of said narrow search area is determined by the size of 5×5 macro block area centered around said original motion vector; and (D) repeating said steps (B–C) for each said macro block in said P/B source picture.

7. The method of claim 2, wherein said step (B1, 2) further includes the step of performing a narrow search to optimize said set of N1 motion vectors substantially pointing out to said camera movement within at least one said P/B source picture further including the steps of:

(A) identifying a set of macro blocks corresponding to said set of N1 motion vectors in said P/B source picture;

(B) for one said macro block in said picture, using one said original motion vector from said set of N1 motion vectors to identify a reference area in a reference picture that corresponding to said macro block;

(C) performing a narrow search in a narrow search area adjacent to said reference area in said reference picture to find an optimum motion vector that points out to an optimum matching macro block in said reference picture; wherein the maximum size of said narrow search area is determined by the size of 7×7 macro block area centered around said original motion vector; and (D) repeating said steps (B–C) for each said macro block in said P/B source picture.

8. The method of claim 7, wherein said step of keeping said set of N1 motion vectors for further global frame processing; and disregarding said set of remaining (N–N1) motion vectors further comprises the step of:
   detecting said camera movement if said N1 of motion vectors is greater than N/2.

9. The method of claim 2, wherein said step (B1, 2) further comprises the steps of:
   calculating a median value of a motion vector from said set N of motion vectors;
   if in said subset N1 of motion vectors, a distance between each said motion vector and said median value is less than said first predetermined value, keeping said set of N1 motion vectors for further global frame processing; and
   disregarding a set of remaining (N–N1) motion vectors; wherein said set of N1 motion vectors substantially points out to said camera movement within at least one said P/B source picture; N being an integer greater or equal to said first predetermined number $N_{threshold}^1:N \geq N1 \geq N_{threshold}^1$; N1 being an integer; $N_{threshold}^1$ being an integer.

10. The method of claim 2, wherein said step (B1, 2) further comprises the steps of:
    calculating an average value of a motion vector from said set N of motion vectors;
    if in said subset N1 of motion vectors, a distance between each said motion vector and said average value is less than said first predetermined value, keeping said set of N1 motion vectors for further global frame processing; and disregarding a set of remaining (N–N1) motion vectors; wherein said set of N1 motion vectors substantially points out to said camera movement within at least one said P/B source picture; N1 being an integer greater or equal to said first predetermined number $N_{threshold}^1:N \geq N1 \geq N_{threshold}^1$; N1 being an integer; $N_{threshold}^1$ being an integer.

11. The method of claim 2, wherein said step (B1, 2) further comprises the steps of:
    (A) selecting a first set of N1 of motion vectors from said set N of motion vectors;
    (B) calculating an average value of a motion vector from said first subset N1 of motion vectors;
    (C) if in said first subset N1 of motion vectors, a distance between each said motion vector and said average value is less than said first predetermined value, keeping said first set of N1 motion vectors for further global frame processing; and disregarding said set of remaining (N–N1) motion vectors; wherein said first set of N1 motion vectors substantially points out to said camera movement within at least one said P/B source picture; N1 being an integer greater or equal to said first predetermined number $N_{threshold}^1:N \geq N1 \geq N_{threshold}^1$; N1 being an integer; $N_{threshold}^1$ being an integer; and
    (D) if in said first subset N1 of motion vectors, a distance between each said motion vector and said median value is greater than said first predetermined value, selecting a second subset N1 of motion vectors from said set N of motion vectors and repeating said steps (B–D).

12. The method of claim 2, wherein said step (B1, 2) further includes the step of performing a full search to optimize said set of remaining (N–N1) motion vectors further including the steps of:
    (A) identifying a set of macro blocks corresponding to said set of (N–N1) motion vectors in said P/B source picture;
    (B) for one said macro block in said picture, using one said motion vector from said set of (N–N1) motion vectors to identify a reference area in a reference picture that corresponding to said macro block;
    (C) performing a full search in a search area adjacent to said reference area in said reference picture to find an optimum motion vector that points out to an optimum matching macro block in said reference picture; and
    (D) repeating said steps (B–C) for each said macro block in said P/B source picture.

13. The method of claim 12, wherein said step (C) of performing said full search further includes the steps of:
    setting a size of said full search area, wherein said size of said full search area depends on the amount of available processing power.

14. The method of claim 12, wherein said step (C) of performing said full search further includes the steps of:
    setting a size of said full search area, wherein said size of said full search area depends on the amount of available processing power.

15. The method of claim 2, wherein said step (B1, 3) further includes the step of performing a narrow search to optimize a set of $N_{moving\_object}$ of motion vectors that substantially points out to substantially all moving objects within at least one said P/B source picture further including the steps of:
    (A) identifying a set of macro blocks corresponding to said set of $N_{moving\_object}$ motion vectors in said P/B source picture;
    (B) for one said original macro block in said picture, using one said original motion vector from said set of $N_{moving\_object}$ motion vectors to identify a reference area in a reference picture that corresponding to said macro block;
    (C) performing a narrow search in a narrow search area adjacent to said reference area in said reference picture to find an optimum motion vector that points out to an optimum matching macro block in said reference picture; wherein the maximum size of said narrow search area is determined by the size of 5×5 macro block area centered around said original motion vector; and
    (D) repeating said steps (B–C) for each said macro block in said P/B source picture.

16. The method of claim 2, wherein said step (B1, 3) further includes the step of performing a narrow search to optimize said set of $N_{moving\_object}$ of motion vectors that substantially points out to substantially all moving objects within at least one said P/B source picture further including the steps of:
    (A) identifying a set of macro blocks corresponding to said set of $N_{moving\_object}$ motion vectors in said P/B source picture;
    (B) for one said original macro block in said picture, using one said original motion vector from said set of $N_{moving\_object}$ motion vectors to identify a reference area in a reference picture that corresponding to said macro block;
    (C) performing a narrow search in a narrow search area adjacent to said reference area in said reference picture to find an optimum motion vector that points out to an optimum matching macro block in said reference picture; wherein the maximum size of said narrow search area is determined by the size of 7×7 macro block area centered around said original motion vector; and (D) repeating said steps (B–C) for each said macro block in said P/B source picture.

17. The method of claim 2, wherein said step (B1, 3) further includes the step of performing a full search to optimize said set of $N_{moving\_object}$ of motion vectors that substantially points out to substantially all moving objects within at least one said P/B source picture further comprising the steps of:

(A) identifying a set of macro blocks corresponding to said set of $N_{moving\_object}$ motion vectors in said picture;

(B) for one said macro block in said picture, using one said motion vector from said set of $N_{moving\_object}$ motion vectors to identify a reference area in a reference picture that corresponding to said macro block;

(C) performing a full search in a search area adjacent to said reference area in said reference picture to find an optimum motion vector that points out to an optimum matching macro block in said reference picture; and (D) repeating said steps (B–C) for each said macro block in said P/B source picture.

18. The method of claim 2, wherein said step (B1, 3) further includes the step of:

setting said number N2 to be greater or equal to two.

19. The method of claim 2, wherein said step (B1, 3) further includes the steps of:

(A) starting with an arbitrary motion vector N belonging to said set of N of motion vectors; wherein said arbitrary motion vector N corresponds to at least one macro block α;

(B) comparing said א motion vector with a motion vector ב belonging to a set of 8 neighboring motion vectors; wherein each said neighboring motion vector ב corresponds to at least one macro block β adjacent to said macro block α;

(C) if a distance between said arbitrary motion vector א and at least one said neighboring motion vector ב is less than said second predetermined value, marking each said motion vector ב as a motion vector ז belonging to a set $N_{moving\ object}$;

(D) replacing said arbitrary motion vector א with one said motion vector ז belonging to said set $N_{moving\ object}$; and (E) repeating said steps (B–D) until said set $N_{moving\ object}$ stops growing.

20. An apparatus for bandwidth scaling of a compressed video stream comprising:

(A) a means for decoding an original previously compressed video stream image having a first level of compression including a first level of quantization, said original video stream comprising a set of original motion pictures; said original video stream image comprising a set of original macro blocks; said set of original macro blocks further comprising a set of I source pictures, a set of P source pictures, and a set of B source pictures; a decompressed video stream image comprising a set of decompressed motion pictures; said decompressed video stream image comprising a set of decompressed macro blocks; said set of decompressed macro blocks further comprising a set of I decompressed pictures, a set of P decompressed pictures, and a set of B decompressed pictures; said means for decoding further comprising:

(A1) a means for recovering and saving a set of original motion vectors for each said P source picture and each said B source picture; wherein each said original motion vector substantially points out to at least one macro block in said original video stream; and (A2) a means for recovering a reconstructed original video stream; wherein said reconstructed original video stream differs from said original video stream by an amount of information lost during an original compression process of said original video stream; said reconstructed original video stream comprising a set of reconstructed original macro blocks; said set of reconstructed original macro blocks further comprising a set of I reconstructed source (RS) pictures, a set of P reconstructed source (RS) pictures, and a set of B reconstructed source (RS) pictures; and (B) a means for encoding said decompressed video stream image to create a re-compressed video stream image having a second level of compression including a second level of quantization, wherein said second level of compression is higher than said first level of compression, and wherein said second level of quantization is stronger than said first level of quantization, said re-compressed video stream image comprising a set of re-compressed motion pictures; said re-compressed video stream image comprising a set of re-compressed macro blocks; said set of re-compressed macro blocks further comprising a set of I destination pictures, a set of P destination pictures, and a set of B destination pictures; said means for encoding further comprising:

(B1) a means for processing said set of recovered and saved original motion vectors for each said P source picture and each said B source picture in order to create a set of usable source motion vectors for each said P destination picture and each said B destination picture;

(B2) a means for removing an interframe redundancy from each said P (RS) picture and from each said B (RS) picture by using said set of usable source motion vectors, wherein the values of a set of pixels in each said I (RS) picture is independently provided, and wherein in each said P (RS) picture, only the incremental changes in each said pixel value from a preceding I (RS) picture or a preceding P (RS) picture are coded, and wherein in each said B (RS) picture, a set of pixel values are coded with respect to both an earlier I (RS)/or P (RS) picture, and a later I (RS)/or P (RS) picture;

(B3) a means for removing intraframe redundancy by performing a 2-dimensional discrete cosine transform (DCT) on a plurality of 8×8 values matrices to map a spatial luminance or chrominance values into the frequency domain;

(B4) a means for performing a quantization process having said second level of quantization of each DCT coefficients by weighting each element of each said 8×8 value matrix in accordance with its chrominance or luminance type and its frequency;

(B5) a means for performing a run length coding for each said weighted element of each said 8×8 value matrix without information loss as an ordered list of a "DC" block coefficient, and alternating pairs of a non-zero "AC" value and a length of zero elements following said non-zero "AC" value; wherein each said element of one said matrix is presented as if said matrix is read in a zigzag manner; and (B6) a means for performing an entropy encoding scheme for each said (RS) video stream in order to further compress the representations of each said DC block coefficient and each AC value-run length pairs using variable length codes;

wherein each said original de-compressed video stream is re-compressed by using said set of reusable source motion vectors;

wherein said means for processing said set of recovered and saved original motion vectors for each said P source picture and each said B source picture further includes:

a means for reducing the differences of the quantization level for each pair of a P source picture/corresponding P destination picture at a first predetermined amount;

a means for reducing the differences of the quantization level for each pair of an I source picture/corresponding I destination picture at a second predetermined amount; and a means for increasing the quantization level for each destination B picture at a third predetermined amount to compensate for the reduction in the quantization level for each pair of an I source picture/corresponding I destination picture, and for each pair of a P source picture/corresponding P destination picture in order to preserve said second compression level;

wherein said reduction of the differences of the quantization level for each pair comprising said I source picture and said corresponding I destination picture by said first predetermined amount; and for each pair comprising said P source picture and said corresponding P destination picture by said second predetermined amount reduces the propagation of errors caused by re-using a plurality of motion vectors originally used for a plurality of source pictures compressed at said first quantization level for a plurality of destination pictures compressed at said second quantization level.

21. The apparatus of claim 20, wherein said means for processing said set of saved original motion vectors for each said P source picture and for each said B source picture further includes:

(B1, 1) a means for analyzing said set of N saved original motion vectors for one said P source picture, or for one said B source picture; N being an integer;

(B1, 2) a means for global frame processing a set of N1 motion vectors and a means for disregarding a set of remaining (N−N1) motion vectors; said means for global frame processing further comprising:

a means for checking whether for each pair comprising a first motion vector from said set of N1 motion vectors and a second motion vector from said set of N1 motion vectors, a distance between said first motion vector and said second motion vector is less than a first predetermined value; wherein said set of N1 motion vectors substantially points out to a camera movement within at least one said P/B source picture; N1 being an integer greater or equal to a first predetermined number $N_{threshold}^1 : N \geq N1 \geq N_{threshold}^1$; N1 being an integer; $N_{threshold}^1$ being an integer; and (B1, 3) a means for local frame processing a set of N2 motion vectors and a means for disregarding a set of remaining (N−N2) motion vectors; said set of N2 motion vectors corresponding to a group of adjacent macro blocks comprising a set of N2 macro blocks; said means for local frame processing further comprising:

a means for checking whether for each pair comprising a first motion vector from said set of N2 motion vectors and a second motion vector from said set of N2 motion vectors, a distance between said first motion vector and said second motion vector is less than a second predetermined value; wherein said set of N2 motion vectors substantially points out to at least one moving object within at least one said P/B source picture; N2 being an integer greater or equal to a second predetermined number $N_{threshold}^2 : N2 \geq N_{threshold}^2$; $N_{threshold}^2$ being an integer; and means for checking whether a set of N2 motion vectors includes a set of substantially all $N_{moving\_object}$ motion vectors; wherein in said set of $N_{moving\_object}$ of motion vectors each said motion vector substantially points out to at least one moving object within at least one said P/B source picture; wherein $N_{moving\_object}$ is an integer less or equal to N.

22. The apparatus of claim 21, wherein said means for global frame processing said set of N1 motion vectors further includes:

a means for performing a narrow search to optimize said set of N1 motion vectors; wherein said set of N1 motion vectors substantially points out to said camera movement within at least one said P/B source picture; and a means for performing a full search to optimize said set of remaining (N−N1) motion vectors.

23. The apparatus of claim 22, wherein said means for performing said narrow search to optimize said set of N1 motion vectors further includes:

(A) a means for identifying a set of macro blocks corresponding to said set of N1 motion vectors in said P/B source picture;

(B) a means for identifying a reference area in a reference picture corresponding to one said macro block in said P/B source picture; and (C) a means for identifying the maximum size of a said narrow search area.

24. The apparatus of claim 21, wherein said means for local frame processing said set of N2 motion vectors further includes:

a means for performing a narrow search to optimize said set of $N_{moving\_object}$ of motion vectors that substantially points out to substantially all moving objects within at least one said P/B source picture.

25. The apparatus of claim 24, wherein said means for performing said narrow search to optimize said set of $N_{moving\_object}$ motion vectors further includes:

(A) a means for identifying a set of macro blocks corresponding to said set of $N_{moving\_object}$ motion vectors in said P/B source picture;

(B) a means for identifying for each said original macro block in said P/B source picture a reference area in a reference picture that corresponding to said macro block; and (C) a means for identifying the maximum size of said narrow search area.

26. The apparatus of claim 21, wherein said means for local frame processing said set of N2 motion vectors further includes:

a means for performing a full search to optimize said set of $N_{moving\_object}$ of motion vectors that substantially points out to substantially all moving objects within at least one said P/B source picture further comprising:

a means for identifying a set of macro blocks corresponding to said set of $N_{moving\_object}$ motion vectors in said P/B source picture; and a means for identifying a reference area in said reference picture that corresponds to each said macro block in said P/B source picture.

27. The apparatus of claim 21, wherein said means for local frame processing said set of N2 motion vectors further includes a programmable chip including the following algorithm:

(A) starting with an arbitrary motion vector א belonging to said set of N of motion vectors; wherein said arbitrary motion vector א corresponds to at least one macro block α;

(B) comparing said א motion vector with a motion vector ב belonging to a set of 8 neighboring motion vectors; wherein each said neighboring motion vector ב corresponds to at least one macro block β adjacent to said macro block α;

(C) if a distance between said arbitrary motion vector א and at least one said neighboring motion vector ב is less than said second predetermined value, marking each said motion vector ב as a motion vector ד belonging to a set $N_{moving\ object}$;

(D) replacing said arbitrary motion vector א with one said motion vector ד belonging to said set $N_{moving\ object}$; and (E) repeating said steps (B–D) until said set $N_{moving\ object}$ stops growing.

* * * * *